US010366574B2

(12) United States Patent
Yamamori et al.

(10) Patent No.: US 10,366,574 B2
(45) Date of Patent: Jul. 30, 2019

(54) GAME APPARATUS, GAME METHOD AND GAME PROGRAM

(71) Applicant: KONAMI DIGITAL ENTERTAINMENT CO., LTD., Tokyo (JP)

(72) Inventors: Masakazu Yamamori, Tokyo (JP); Nao Sasaki, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 254 days.

(21) Appl. No.: 15/596,664

(22) Filed: May 16, 2017

(65) Prior Publication Data

US 2017/0365132 A1 Dec. 21, 2017

(30) Foreign Application Priority Data

Jun. 21, 2016 (JP) ................................ 2016-122895

(51) Int. Cl.

*G06F 17/00* (2019.01)
*G07F 17/32* (2006.01)
*G07F 17/34* (2006.01)

(52) U.S. Cl.

CPC ...... *G07F 17/3267* (2013.01); *G07F 17/3213* (2013.01); *G07F 17/3269* (2013.01); *G07F 17/34* (2013.01)

(58) Field of Classification Search

None

See application file for complete search history.

(56) References Cited

FOREIGN PATENT DOCUMENTS

| | | |
|---|---|---|
| JP | 2006-006824 A | 1/2006 |
| JP | 2006-247285 A | 9/2006 |
| JP | 2008-48950 A | 3/2008 |

OTHER PUBLICATIONS

Communication dated Sep. 12, 2017 issued by the Japanese Patent Office in counterpart application No. 2016-122895.

Communication dated Aug. 21, 2018, issued by the Taiwanese Patent Office in corresponding application No. 106120395.

Communication dated Apr. 3, 2018 from the Japanese Patent Office in counterpart Application No. 2016-122895.

Notice of Allowance dated Nov. 8, 2018 issued by the Taiwanese Intellectual Property Office in application No. 106120395.

Communication dated Jan. 9, 2018, issued by the Japanese Patent Office in counterpart application No. 2016-122895.

*Primary Examiner* — Paul A D'Agostino
(74) *Attorney, Agent, or Firm* — Sughrue Mion, PLLC

(57) ABSTRACT

A game apparatus having a symbol arrangement device; a change condition determination device; an area range changing device; and a specific reward granting device. The symbol arrangement device arranges a plurality of symbols which are different in type. The change condition determination device determines, based on the plurality of symbols arranged by the symbol arrangement device, whether or not there is satisfied at least an area change condition for changing a range of a symbol-arranging area on which the plurality of symbols can be arranged by the symbol arrangement device. The area range changing device changes the range of the symbol-arranging area in case that the change condition determination device determined that there is satisfied the area change condition. The specific reward granting device grants a specific reward where at least a specific range condition that the range of the symbol-arranging area is changed into a specific range.

20 Claims, 13 Drawing Sheets

| SYMBOL | VALUE | PROBABILITY OF APPEARANCE |
|---|---|---|
| PLUM | 1 | • • • |
| ORANGE | 1 | • • • |
| CHERRY | 2 | • • • |
| MELON | 3 | • • • |
| BELL | 4 | • • • |
| BAR1 | 5 | • • • |
| BAR2 | 6 | • • • |
| BAR3 | 7 | • • • |
| BLUE 7 | 8 | • • • |
| RED 7 | 8 | • • • |
| • • • | • • • | • • • |

| | 3 JOINED | 4 JOINED | 5 JOINED | · · · |
|---|---|---|---|---|
| GOLD 7 | 4 | 8 | 16 | · · · |
| SILVER 7 | 3 | 6 | 12 | · · · |
| RED 7 | 2 | 4 | 8 | · · · |
| BLUE 7 | 1 | 2 | 4 | · · · |

| | ITEM A | ITEM B | ITEM C | ITEM D |
|---|---|---|---|---|
| VALUE | 2 | 4 | 8 | 16 |

FIG. 17
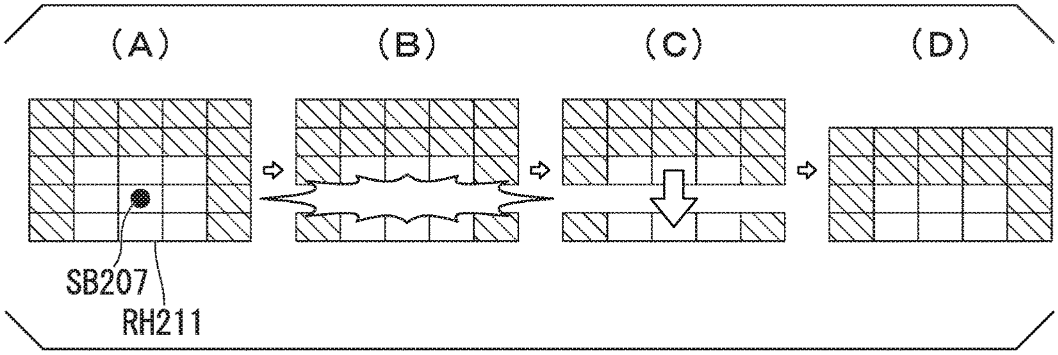
FIG. 18
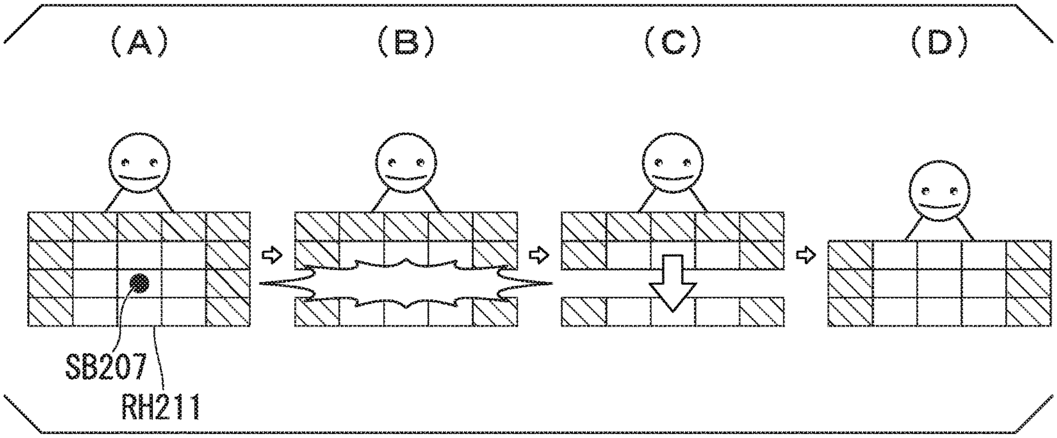
FIG. 19
| NUMBER OF LEVELS | 1 | 2 | 3 | 4 OR MORE |
|---|---|---|---|---|
| ACCUMULATION PROBABILITY | 5% | 7% | 15% | 15% |

GAME APPARATUS, GAME METHOD AND GAME PROGRAM

TECHNICAL FIELD

Embodiments of the present invention generally relate to a game apparatus, a game method and a game program.

BACKGROUND ART

Japanese Patent Application Publication No. 2006-6824 discloses a plurality of reels spin which is used to grant a reward, or disbursement, to a player based on the combination of symbols, pictures, when the rotation of each reel stops in a slot machine game. There is a slot machine game in which a high-disbursement specific reward, for example, a jackpot reward, is granted if a specific symbol combination occurs. The slot machine game designed to determine suddenly the granting of a specific reward will not provide a game player with the feeling of expectation of obtaining a specific reward in a stepwise manner.

SUMMARY

In some aspects, a game apparatus may include, but is not limited to, a game apparatus. The game apparatus may include, but is not limited to, a symbol arrangement device; a change condition determination device; an area range changing device; and a specific reward granting device. The symbol arrangement device may be configured to arrange a plurality of symbols which are different in type from among each other. The change condition determination device may be configured to determine, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device. The area range changing device may be configured to change the range of the symbol-arranging area in case that the change condition determination device determined that there is satisfied the area change condition. The specific reward granting device may be configured to grant a specific reward in cases that there is satisfied at least a specific range condition that the range of the symbol-arranging area is changed by the area range changing device into a specific range.

BRIEF DESCRIPTION OF THE DRAWINGS

FIG. 17 describes the processing when a "range change" symbol appears.

FIG. 18 describes an example in which the range of the area in which symbols can be placed becomes a specific range.

FIG. 19 shows an example of the probabilities of items accumulating.

DETAILED DESCRIPTIONS

Figure 1:
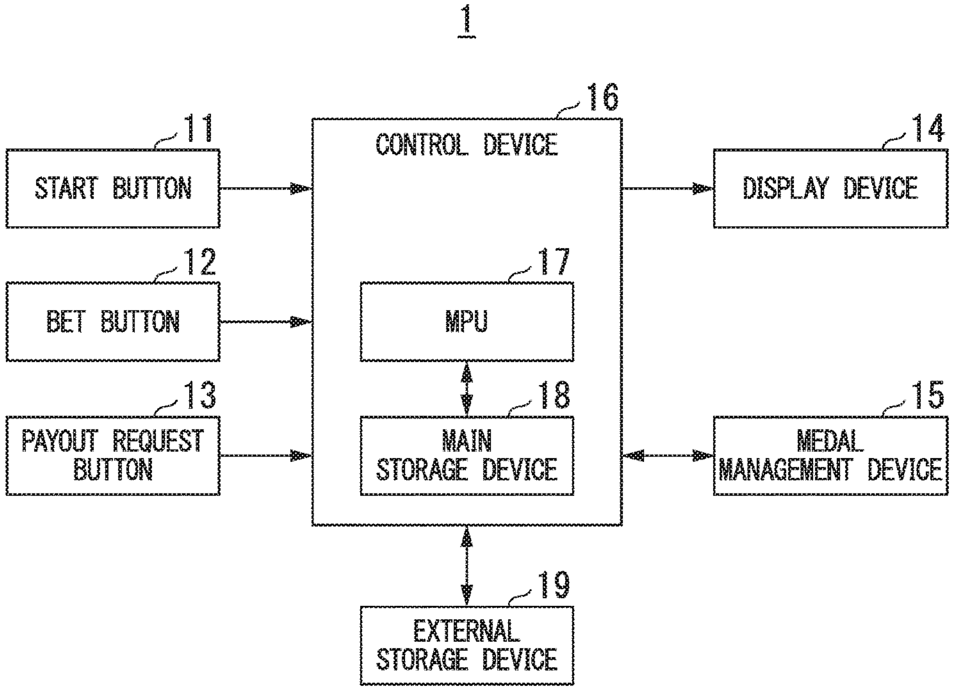
FIG. 1 is a block diagram showing an example of the general configuration of a game apparatus according to a first embodiment.

In some aspects, a game apparatus may include, but is not limited to, a game apparatus. The game apparatus may include, but is not limited to, a symbol arrangement device; a change condition determination device; an area range changing device; and a specific reward granting device. The symbol arrangement device may be configured to arrange a plurality of symbols which are different in type from among each other. The change condition determination device may be configured to determine, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device. The area range changing device may be configured to change the range of the symbol-arranging area in case that the change condition determination device determined that there is satisfied the area change condition. The specific reward granting device may be configured to grant a specific reward in cases that there is satisfied at least a specific range condition that the range of the symbol-arranging area is changed by the area range changing device into a specific range.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied.

In some cases, the change condition determination device is configured to determine whether or not there is satisfied the area change condition that at least a part of the plurality of symbols is of a predefined specific type.

In some cases, the area range changing device is configured to change the range of the symbol-arranging area, based at least in part on the number of symbols of the predefined specific type.

In some cases, the change condition determination device is configured to change a range of determination area in the range of the symbol-arranging area, where the change condition determination device determines whether or not there is satisfied the area change condition on the range of determination area.

In some cases, the area range changing device is configured to change the range of the symbol-arranging area to change the number of symbols arrangeable on the symbol-arranging area.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The area range standardizing device may be configured to standardize the range of the symbol-arranging area into a standard range in case that the at least standard condition that a predetermined timing comes is satisfied.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The area range standardizing device may be configured to standardize the range of the symbol-arranging area into a standard range in case that the at least standard condition that a predetermined timing comes is satisfied. The area range standardizing device may be configured to determine that the predetermined timing comes and the standard condition is satisfied in case that the symbol arrangement device performed symbol arrangement at predefined times.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The area range standardizing device may be configured to automatically determine the range of the symbol-arranging area every time a predefined range determination condition is satisfied.

In some cases, the game apparatus may include, but is not limited to, an area range determination device configured to determine whether the range of the symbol-arranging area becomes a specific range. The specific reward granting device may be configured to grant the specific reward in cases that there is satisfied at least a specific range determination condition that the area range determination device determined that the range of the symbol-arranging area becomes the specific range.

In some cases, the game apparatus may include, but is not limited to, an area range determination device and an area range standardizing device. The area range determination device may be configured to determine whether the range of the symbol-arranging area becomes a specific range. The specific reward granting device may be configured to grant the specific reward in cases that there is satisfied at least a specific range determination condition that the area range determination device determined that the range of the symbol-arranging area becomes the specific range. The area range standardizing device may be configured to standardize the range of the symbol-arranging area into a standard range in case that at least a standard condition is satisfied. The area range determination device may be configured to determine whether the range of the symbol-arranging area becomes the specific range before the at least standard condition is satisfied.

In some cases, the game apparatus may include, but is not limited to, an area range determination device. The area range determination device may be configured to determine whether the range of the symbol-arranging area becomes a specific range. The specific reward granting device may be configured to grant the specific reward in cases that there is satisfied at least a specific range determination condition that the area range determination device determined that the range of the symbol-arranging area becomes the specific range. The area range determination device is configured to determine that the range of the symbol-arranging area becomes the specific range in case that the area range determination device determined that the range of the symbol-arranging area has at least one of a predefined number of rows and columns.

In some cases, the game apparatus may include, but is not limited to, an area range determination device and an area range standardizing device. The area range determination device may be configured to determine whether the range of the symbol-arranging area becomes a specific range. The specific reward granting device may be configured to grant the specific reward in cases that there is satisfied at least a specific range determination condition that the area range determination device determined that the range of the symbol-arranging area becomes the specific range. The area range standardizing device may be configured to standardize the range of the symbol-arranging area into a standard range in case that at least a standard condition is satisfied. The area range determination device may be configured to determine whether the range of the symbol-arranging area becomes the specific range before the at least standard condition is satisfied. The area range determination device is configured to determine that the range of the symbol-arranging area becomes the specific range in case that the area range determination device determined that the range of the symbol-arranging area has at least one of a predefined number of rows and columns.

In some cases, the specific reward granting device may be configured to determine contents of the specific reward, based on a timing when the range of the symbol-arranging area becomes the specific range.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The specific reward granting device may be configured to determine contents of the specific reward, based on a timing when the range of the symbol-arranging area becomes the specific range.

In some cases, the game apparatus may include, but is not limited to, a specific-value accumulation device configured to accumulate specific-values of plural types which are different in value from among each other. The area range determination device may be configured to determine whether the range of the symbol-arranging area becomes the specific range before the at least standard condition is satisfied.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The specific reward granting device may be configured to determine contents of the specific reward, based on a timing when the range of the symbol-arranging area becomes the specific range. The area range determination device may be configured to determine that the range of the symbol-arranging area becomes the specific range in case that the area range determination device determined that the range of the symbol-arranging area has at least one of a predefined number of rows and columns.

In some cases, the game apparatus may include, but is not limited to, a specific-value accumulation device configured to accumulate specific-values of plural types which are different in value from among each other. The area range determination device may be configured to determine whether the range of the symbol-arranging area becomes the specific range before the at least standard condition is satisfied. The area range determination device may be configured to determine that the range of the symbol-arranging area becomes the specific range in case that the area range determination device determined that the range of the symbol-arranging area has at least one of a predefined number of rows and columns.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The specific reward granting device may be configured to determine contents of the specific reward, based on a timing when the range of the symbol-arranging area becomes the specific range. The area range determination device may be configured to determine that the range of the symbol-arranging area becomes the specific range in case that the area range determination device determined that the range of the symbol-arranging area has at least one of a predefined number of rows and columns. The area range determination device may be configured to determine that the range of the symbol-arranging area becomes the specific range in case that the area range determination device determined that the range of the symbol-arranging area has at least one of a predefined number of rows and columns.

In some cases, the specific reward granting device may be configured to determine contents of the specific reward, based on a timing when the range of the symbol-arranging area becomes the specific range.

In some cases, the game apparatus may include, but is not limited to, an area range standardizing device configured to standardize the range of the symbol-arranging area into a standard range in case that at least a standard condition is satisfied. The specific reward granting device may be configured to grant the specific reward in cases that there is satisfied at least a specific range timing condition that the range of the symbol-arranging area is changed by the area range changing device into the specific range before the standard condition is satisfied. The specific reward granting device may be configured to determine contents of the specific reward, based on a timing when the range of the symbol-arranging area becomes the specific range.

In some cases, the game apparatus may include, but is not limited to, a specific-value accumulation device configured to accumulate specific-values of plural types which are different in value from among each other. The specific reward granting device may be configured to select one or more of the specific-values of plural types which are different in value from among each other, wherein the specific-values are accumulated.

In some cases, the game apparatus may include, but is not limited to, an area range determination device configured to determine whether the range of the symbol-arranging area becomes a specific range. The change condition determination device may be configured to change a range of determination area in the range of the symbol-arranging area, where the change condition determination device determines whether or not there is satisfied the area change condition on the range of determination area. The specific reward granting device may be configured to grant the specific reward in cases that there is satisfied at least a specific range determination condition that the area range determination device determined that the range of the symbol-arranging area becomes the specific range.

In some cases, the game apparatus may include, but is not limited to, an area range determination device configured to determine whether the range of the symbol-arranging area becomes a specific range. The change condition determination device may be configured to change a range of determination area in the range of the symbol-arranging area, where the change condition determination device determines whether or not there is satisfied the area change condition on the range of determination area. The specific reward granting device may be configured to grant the specific reward in cases that there is satisfied at least a specific range determination condition that the area range determination device determined that the range of the symbol-arranging area becomes the specific range. The area range determination device is configured to determine that the range of the symbol-arranging area becomes the specific range in case that the area range determination device determined that the range of the symbol-arranging area has at least one of a predefined number of rows and columns.

In other aspects, a game method may include, but is not limited to, arranging a plurality of symbols which are different in type from among each other; determining, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device; changing the range of the symbol-arranging area in case that the change condition determination device determined that there is satisfied the area change condition; and granting a specific reward in cases that there is satisfied at least a specific range condition that the range of the symbol-arranging area is changed by the area range changing device into a specific range.

In other aspects, a non-transitory computer readable storage medium that stores one or more computer programs, when executed by a computer, to cause the computer, to perform a game method which may include, but is not limited to, arranging a plurality of symbols which are different in type from among each other; determining, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device; changing the range of the symbol-arranging area in case that the change condition determination device determined that there is satisfied the area change condition; and granting a specific reward in cases that there is satisfied at least a specific range condition that the range of the symbol-arranging area is changed by the area range changing device into a specific range.

Embodiments of the present invention will be described below, with references made to the drawings.

First Embodiment

FIG. 1 is a block diagram showing an example of the general configuration of a game apparatus 1 according to an embodiment of the present invention. The illustrated game apparatus 1 has a start button 11, a bet button 12, and a payout request button 13 as input devices to accept operations from a player, a display device 14, a medal management device 15 that manages the insertion and payout of medals as the playing medium, and a control device 16 that controls the game. The start button 11, in response to being pressed by the player, outputs a game start signal to the control device 16. Each time it is pressed by the player, the bet button 12 outputs a bet signal to the control device 16. The payout request button 13, in response to being pressed by the player, outputs a medal payout request signal to the control device 16. The display device 14 is constituted so as to include a liquid crystal display panel, an organic EL (electroluminescence) display panel, or the like, and displays a game screen or the like in response to an image signal output from control device 16. The medal management device 15 outputs a medal insertion signal to the control device 16 each time insertion of a medal by the player is detected, and pays out medals to the player in response to a medal payout signal from the control device 16.

The control device 16 is constituted as a computer unit that includes a microprocessing unit (MPU) 17 and a main storage device 18, such as a ROM (read-only memory) or RAM (random-access memory) required for the operation of the MPU 17. The control device 16 has connected thereto an external storage device 19 that uses, for example, a magnetic disk storage device. The external storage device 19 stores a program and data for controlling a game, the program and data, in accordance with instructions from the MPU 17, being read into the main storage device 18 from the external storage device 19 as required. In the control device 16, in accordance with the program read into the main storage device 18, the MPU 17 controls the progress of a game by executing various computational processing and operation processing. As an example of the game apparatus 1 of the present embodiment, the buttons 11 to 13, the display device 14, the medal management device 15, and the control device 16 are built into an enclosure (not shown) to constitute a commercial game apparatus that provides to a player a game of a certain scope in exchange for game value that is symbolized by medals. For example, in a game provided by the game apparatus 1, a win determination is made in accordance with the disposition of a plurality of symbols displaced on a N-row-by-M-column matrix boxes (where N and M are positive integers, such as three rows and three columns), so as to determine the disbursement to the player, in a so-called slot machine game.

(Game Overview)

Figure 2:
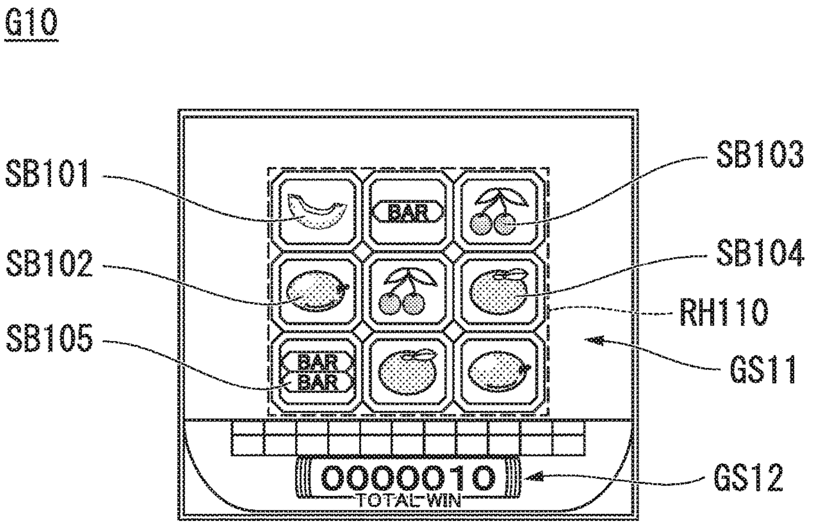
FIG. 2 shows an example of a game screen of a slot machine game according to the first embodiment.

FIG. 2 shows an example of a game screen of a slot machine game according to the present embodiment. In this drawing, the reference symbol G10 indicates the overall game screen area according to the present embodiment, and, in the description to follow, this will be referred to as the game screen G10, regardless of the content displayed thereon. The game screen G10 displays the slot machine screen GS11 and the number of wins (WIN) screen GS12. The area RH110 within the slot machine screen GS11 is an area in which symbols can be arranged (hereinafter sometimes called the "symbol-arranging area"), and is a determination area in which a win determination is made. It is not necessary, however, for the entire range of the symbol-arranging area to be the win determination area, and a partial range of the symbol-arranging area may be the win determination area. On the slot machine screen GS11, nine symbols are arranged in a matrix arrangement of three rows and three columns. The symbol types are distinguished by visual elements that can be recognized by the player, such as a picture, design, numeral, color, and shape. For example, the symbols arranged in the symbol-arranging area RH110 on the slot machine screen GS11 are a symbol SB101 that has a melon design, a symbol SB102 that has a plum design, a symbol SB103 that has a cherry design, a symbol SB104 that has an orange design, and a symbol SB105 that has a BAR design, so that they are displayed with various pictures, designs, numerals, and shapes as information for distinguishing the symbol types. Each time nine symbols are arranged in the symbol-arranging area RH110, a win determination is made. In the following, a symbol with, for example, an "ABC" design (picture, numeral, shape, or the like) will also be referred to as simply as an "ABC" symbol.

In the symbol-arranging area RH110, total number of eight win lines are three lines in the vertical direction, three lines in the horizontal direction, and two lines in the diagonal direction (direction between diagonally opposing corners of the slot machine screen GS11) and are set as the determination criteria (hereinafter, a win condition) when performing a win determination. For example, the number of winning lines is set as these eight lines, regardless of the number of medals bet by the player. If all three of the symbols arranged on any winning line are the same type, the determination is made that a win condition is satisfied, and the player is granted a disbursement. That is, the player is granted a disbursement if all three symbols of the same type are in one direction (continuously) with no symbol of a different type among them. In the following, the disbursement granted to a player when the win condition is satisfied will also be call the "normal reward."

The number of wins (WIN) screen GS12 displays the number of medals to be disbursed to the player. Although it is omitted from the drawing, there are on the game screen G10, for example, displays of the number of medals bet by the player (bet medal count), the number of medals to be paid out to the player (payout medal count), and the number of inserted medals that can be bet by the player (credit medal count).

In the slot machine game according to the present embodiment, the range of the symbol-arranging area RH110 is changed, based on at least one part of the symbols arranged in the symbol-arranging area RH110. For example, in the example shown in FIG. 2, the nine boxes of three columns and three rows in a matrix arrangement are the range of the symbol-arranging area RH110, and the range of the symbol-arranging area RH110 is changed if an area change condition is satisfied.

In this case, the area change condition is the condition for changing the range of the symbol-arranging area RH110. This condition is, for example, at least a part of the symbols arranged in the symbol-arranging area RH110 being a prescribed combination. The prescribed combination is, for example, the simultaneous occurrence of three of the same symbol type neighboring in one direction (continuously), or the occurrence of three symbols of a specific type neighboring in one direction (continuously). The area change condition is not restricted to being a combination of symbols arranged as noted above and can be, for example, the disposition of a specific type of symbol.

When the area change condition is satisfied, the range of the symbol-arranging area RH110 changes. FIG. 3 to FIG. 6 show examples of the change in the range of the symbol-arranging area RH110.

Figure 3:
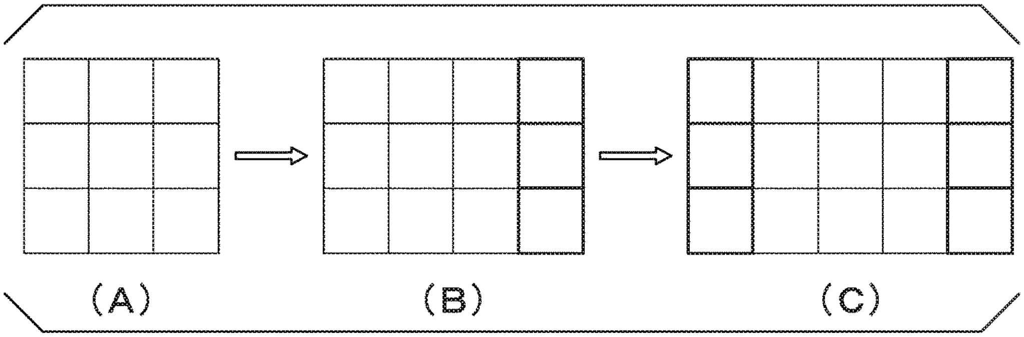
FIG. 3 shows an example in which the columns of the area in which symbols can be placed increase.

FIG. 3 shows an example in which the columns of the symbol-arranging area are increased. In the example illustrated, the symbol-arranging area changes from the state (A), in which it is three rows and three columns, to the state (B), in which one column is added on the right side upon the first time of satisfying of the area change condition, to make it three rows and four columns, and then to the state (C), in which an additional column is added on the left side upon the second time of satisfying of the area change condition, thereby becoming three rows and five columns. When the columns of the symbol-arranging area are increased, a column may be added only at either the right side or the left side.

Figure 4:
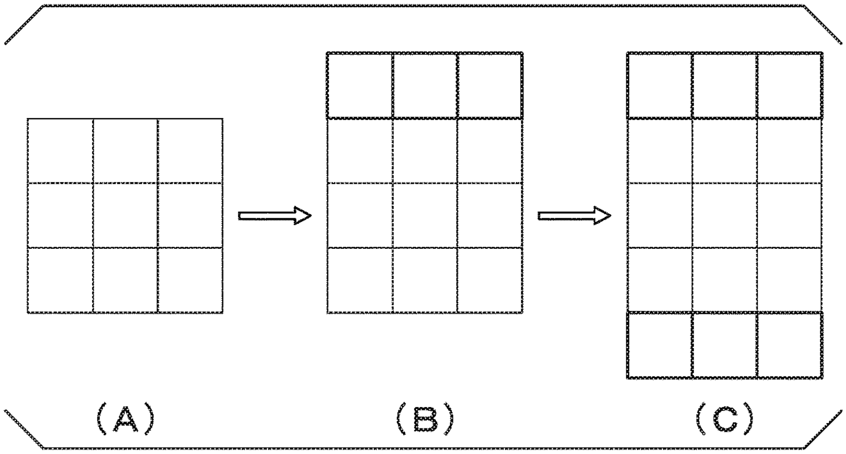
FIG. 4 shows an example in which the rows of the area in which symbols can be placed increase.

FIG. 4 shows an example in which the rows of the symbol-arranging area are increased. In the example illustrated, the symbol-arranging area changes from the state (A), in which it is three rows and three columns, to the state (B) in which one row is added at the top upon the first time of satisfying of the area change condition, to make it four rows and three columns, and then to the state (C), in which an additional row is added at the bottom upon the second time of satisfying of the area change condition, thereby become five rows and three columns. When the rows of the symbol-arranging area are increased, a row may be added only at either the top or the bottom.

Figure 5:
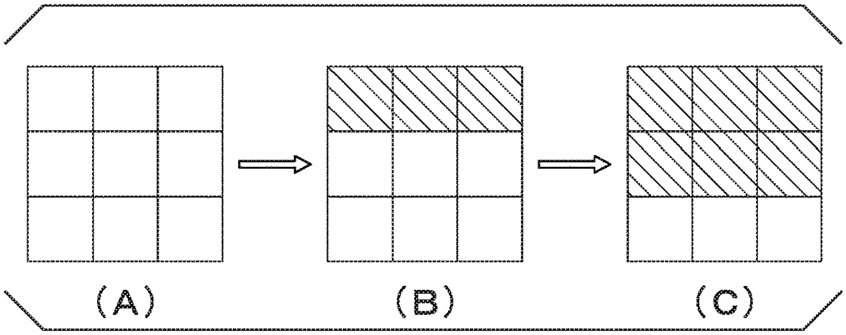
FIG. 5 shows an example in which the rows of the area in which symbols can be placed decrease.

FIG. 5 shows an example in which the rows of the symbol-arranging area are decreased. In the example illustrated the symbol-arranging area changes from the state (A), in which it is three rows and three columns, to state (B), in which one row at the top is removed upon the first time of satisfying the area change condition, making it two rows and three columns, and then to state (C), in which an additional row is further removed from the top upon the second time of satisfying of the area change condition, making it one row and three columns. If the rows of the symbol-arranging area are reduced, the rows at the bottom may be reduced. The columns of the symbol-arranging area may be reduced instead of reducing the row of the symbol-arranging area or in addition to reducing the rows of the symbol-arranging area.

Figure 6:
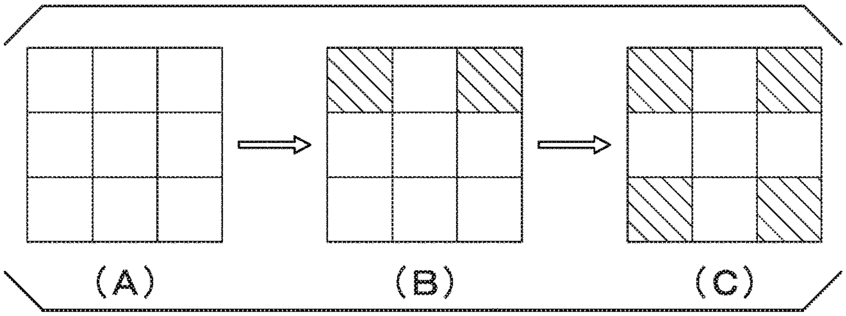
FIG. 6 shows an example in which the area in which symbols can be placed decreases in units of boxes.

FIG. 6 shows an example in which the symbol-arranging area is decreased in units of boxes. In the example illustrated, the symbol-arranging area changes from state (A), in which it is three rows and three columns, to state (B), in which the boxes at the two ends of the upper row are removed upon the first time of satisfying the area change condition, and then to state (C), in which the boxes at the two ends of the lower row are further removed upon the second time of satisfying of the area change condition. The symbol-arranging area may be increased in units of boxes instead of reducing symbol-arranging area in unit of boxes, or in addition to reducing the symbol-arranging area in units of boxes.

The manner in which the range of the symbol-arranging area changes is not restricted to being an increase or a decrease of the surface area of the range, and may be a change of the position of the range of the symbol-arranging area.

Figure 7:
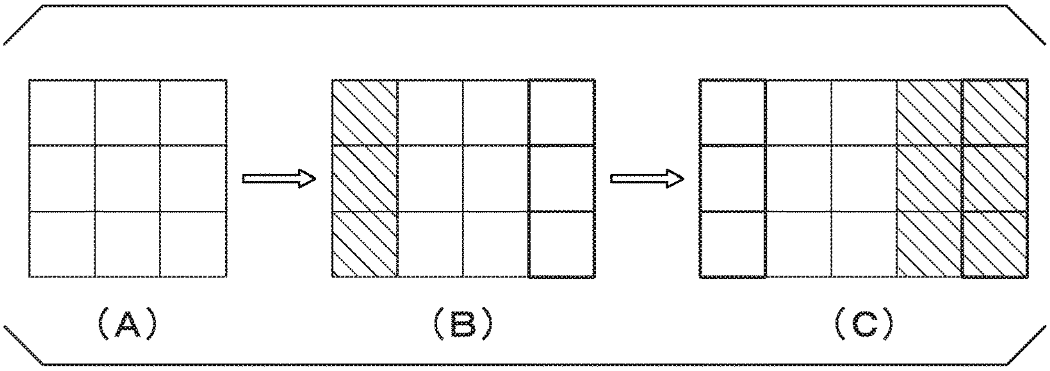
FIG. 7 shows an example in which the position of the area in which symbols can be placed changes.

FIG. 7 shows an example in which the position of the range of the symbol-arranging area changes. In the example illustrated, the symbol-arranging area changes from state (A), in which it is three rows and three columns, to state (B), in which, upon the first time of the satisfying of the area change condition, one column is added at the right side and one column is removed from the left side, so that the three-column, three-row range moves by one column to the right, and then to state (C), in which, upon the second time of satisfying the area change condition, one column is further added to the left side and two columns are removed from the right side, resulting in the three-column, three-row range moving two columns to the left. The symbol-arranging area may be moved upward or downward by the increase and decrease of the rows.

Figure 8:
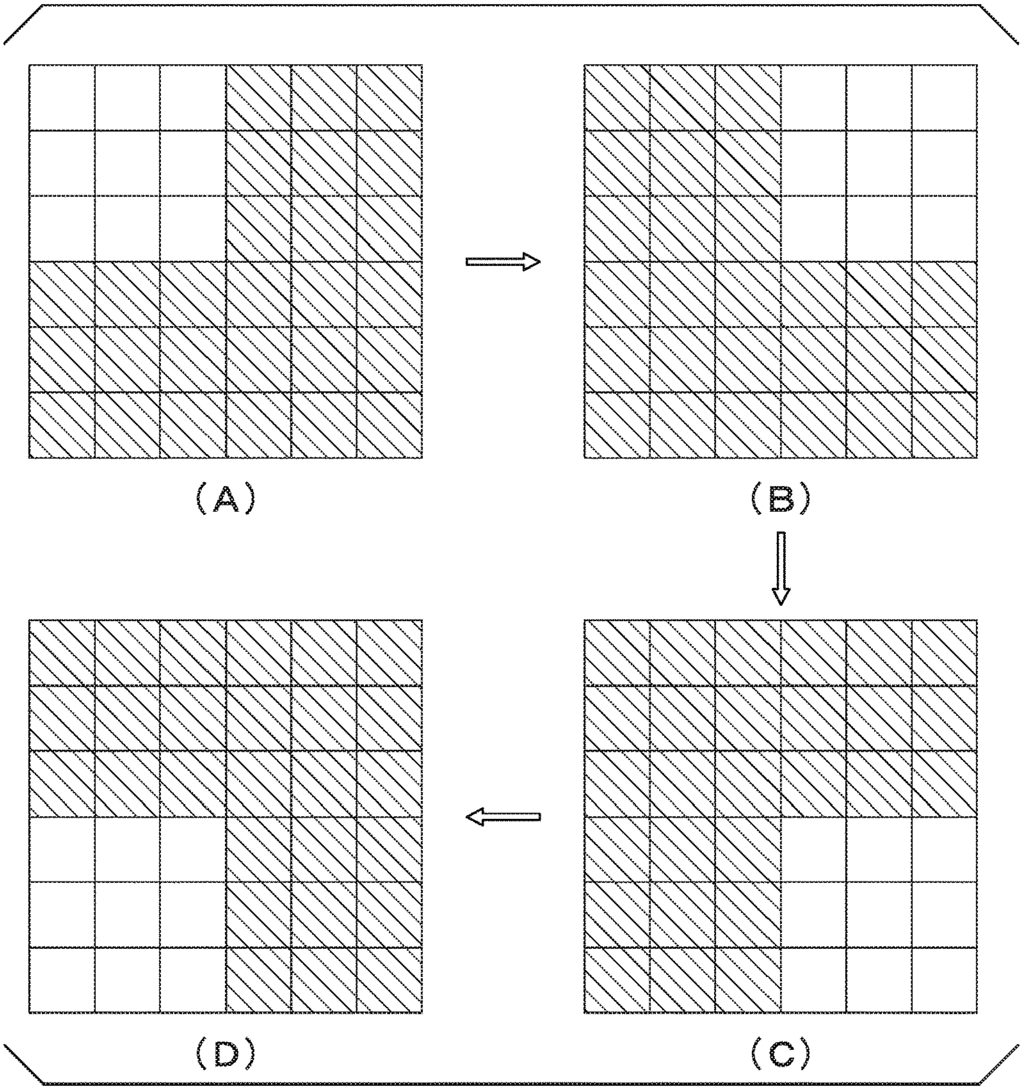
FIG. 8 shows another example in which the position of the area in which symbols can be placed changes.

FIG. 8 shows another example in which the position of the symbol-arranging area is changed. In the example illustrated, each time the area change condition is satisfied, the three-row, three-column area of the six rows and six columns, in which symbols can be arranged in the matrix-arranged area in 36 boxes, transitions successively from the three-row, the three-column state (A) at the upper-left, to the three-row, three-column state (B) at the upper-right, to the three-row, three-column state (C) at the lower-right, and then to the three-row, three-column state (D) at the lower-left.

By the area change condition being satisfied and by the symbol-arranging area range changing as shown in FIG. 3 to FIG. 8, a player is granted a specific reward with at least the condition that the range of the symbol-arranging area has become the specific range. In the following, the term "specific reward" will be used in distinction from the above-described "normal reward." For example, the specific reward is a special reward of obtaining a larger disbursement than the normal reward. The above-described specific range is a pre-established symbol-arranging area that is the condition for granted the specific reward. For example, the symbol-arranging area at (C) in FIG. 3 to FIG. 7 can be made the specific range, and the symbol-arranging area at (D) in FIG. 8 may be made the specific range. The number symbols that can be arranged (number of boxes) in a specific range may be set.

(Functional Configuration of Processing Executed by the MPU)

Next, the functional configuration of the MPU 17 as a game control device executing game processing based on a program for controlling a game will be described.

Figures 9, 10:
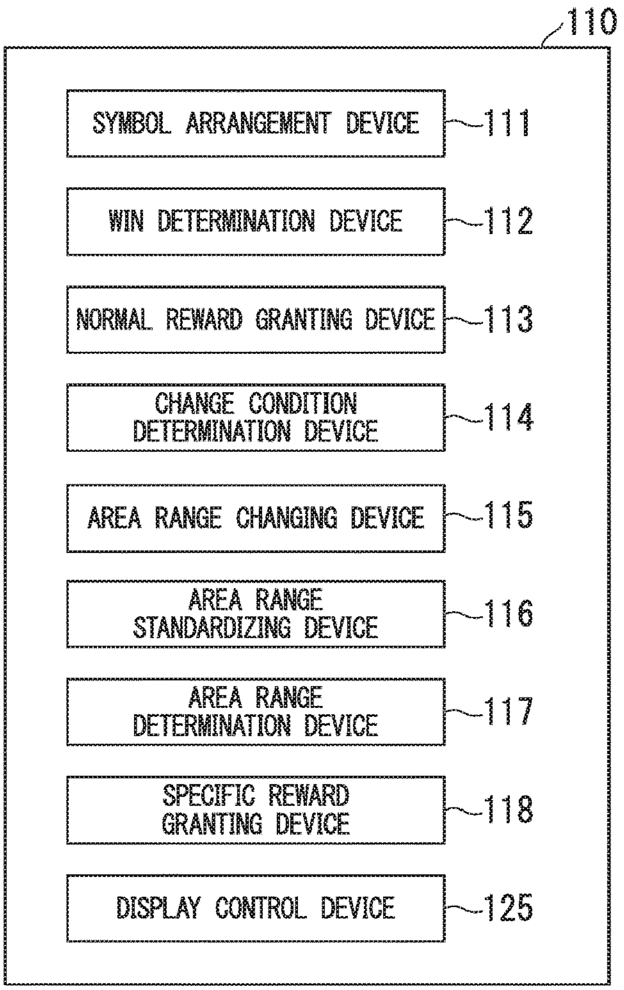
FIG. 9 shows an example of the functional configuration of a game control device 110 according to a first embodiment.
FIG. 10 shows an example of symbol data.

FIG. 9 shows an example of the functional configuration of the game control device 110 according to the present embodiment. The game control device 110 illustrated has a symbol arrangement device 111, a win determination device 112, a normal reward granting device 113, a change condition determination device 114, an area range changing device 115, an area range standardizing device 116, an area range determination device 117, a specific reward granting device 118, and a display control device 125.

The symbol arrangement device 111 arranges a plurality of symbols in the symbol-arranging area RH110 within the slot machine screen GS11. For example, the symbol arrangement device 111 references symbol data stored in the main storage device 18 and selects the type of symbols to be caused to appear in the boxes on the slot machine screen GS11 by drawing. FIG. 10 shows an example of symbol data. Symbol data is, in association with each other, the type of symbols that can be arranged in the symbol-arranging area RH110, the value thereof, and the probability of them appearing. The symbol types include plum, orange, cherry, melon, bell, BAR1, BAR2, BAR3, Blue 7, Red 7, and the like. The symbol types are not restricted to the above-noted types, and various types of symbols can be used. For example, symbols to which special functions are set may be used. The special function, for example, may be that the disposition of that symbol in the symbol-arranging area RH110 satisfies the area change condition. The value is set for each type of symbol beforehand. For example, the higher the value of a symbol type, the higher is set the disbursement when the win condition is satisfied. The probability of appearance indicates the probability of appearing (being arranged) in the boxes on the slot machine screen GS11. For example, the higher is the value of a symbol type, the lower is set its probability of appearing.

The win determination device 112 makes a win determination by whether or not the win condition has been satisfied, based on the disposition of a plurality of symbols in the symbol-arranging area RH110 (that is, the determination area). For example, the win determination device 112, in accordance with a plurality of symbols having been arranged in the symbol-arranging area RH110 by the symbol arrangement device 111, determines whether or not the win condition has been satisfied, based on the symbols arranged in the symbol-arranging area RH110.

If the win determination device 112 determines that the win condition has been satisfied, the normal reward granting device 113 grants a normal reward (normal disbursement) to the player.

The change condition determination device 114, based on at least a part of the symbols arranged by the symbol arrangement device 111, determines whether or not the area change condition, for the symbol arrangement device 111 to change the range of the symbol-arranging area RH110, is satisfied.

If the change condition determination device 114 determines that the area change condition is satisfied, the area range changing device 115 changes the range of the symbol-arranging area RH110. For example, if the determination is made that the area change condition is satisfied, the area range changing device 115 changes the range of the symbol-arranging area RH110 as described referring to FIG. 3 to FIG. 7. By changing the range of the symbol-arranging area RH110, the area range changing device 115 may change (increase or decrease) the number of boxes in which symbols may be arranged (the surface area of the range of the symbol-arranging area), or may move the position of the range of the symbol-arranging area, without changing the number of boxes in which symbols can be arranged.

If the standardizing condition has been satisfied, the area range standardizing device 116 makes the range of the symbol-arranging area RH110 the standard range. In this case, the standard range is a range that is different from the specific range and also is the range that should be taken as the standard of the symbol-arranging area RH110. For example, the standard range is the range of the symbol-arranging area at the start of the game, such as shown in (A) in FIG. 3 to FIG. 8. For example, if the standardizing condition has been satisfied, the area range standardizing device 116 returns (initializes) the range of the symbol-arranging area RH110 to the range at the start of the game.

The area range standardizing device 116 takes the arrival of a prescribed time to be at least one standardizing condition. For example, if symbol disposition is done by the symbol arrangement device 111 a prescribed number of times (for example, 20 times), the area range standardizing device 116 determines that the prescribed times has arrived, and returns the range of the symbol-arranging area to the standard range.

The area range determination device 117 determines whether or not the range of the symbol-arranging area RH110 has become the specific range. For example, the area range determination device 117 determines whether or not the range of the symbol-arranging area RH110 has become the specific range before the satisfying of the standardizing condition. The specific range, for example as described above, is the range of the symbol-arranging area in (C) of FIG. 3 to FIG. 5, and is set as a prescribed number of rows and/or a prescribed number of columns. For example, if the range of the symbol-arranging area RH110 is the prescribed number of rows and/or prescribed number columns, the area range determination device 117 may determine that it has become the specific range.

The specific range, for example as described above, may be the range of the symbol-arranging area in (C) of FIG. 6 or (D) of FIG. 8. For example, if the position of the range of the symbol-arranging area is the prescribed position, the area range determination device 117 may determine that it has become the specific range. If the range of the symbol-arranging area in (C) of FIG. 6 is taken to be the specific range, the area range determination device 117 may, if the number of symbols that can be arranged is the prescribed number, determine that it has become the specific range.

The specific reward granting device 118, based on the determination result of the area range determination device 117, grants a specific reward, with at least the condition that the range of the symbol-arranging area RH110 has become the specific range. That is, the specific reward granting device 118 grants a specific reward with the determination by the area range determination device 117 that the range of the symbol-arranging area RH110 has become the specific range as at least a condition. For example, the specific reward granting device 118 grants a specific reward with at least the range of the symbol-arranging area RH110 having become the specific range before the satisfying of the standardizing condition as at least a condition.

The display control device 125 generates image data of a game image to be displayed on the display device 14, and outputs an image signal based on the generated image data to the display device 14. Doing this, the display control device 125 causes display on the display device 14 of the game screen. For example, the display control device 125 causes display on the display device 14 of the game screen G10 (FIG. 2) that includes the slot machine screen GS11 in which a plurality of symbols are arranged by the symbol arrangement device 111.

(Game Processing Operation)

Next, the operation of the game processing according to the present embodiment will be described.

Figure 11:
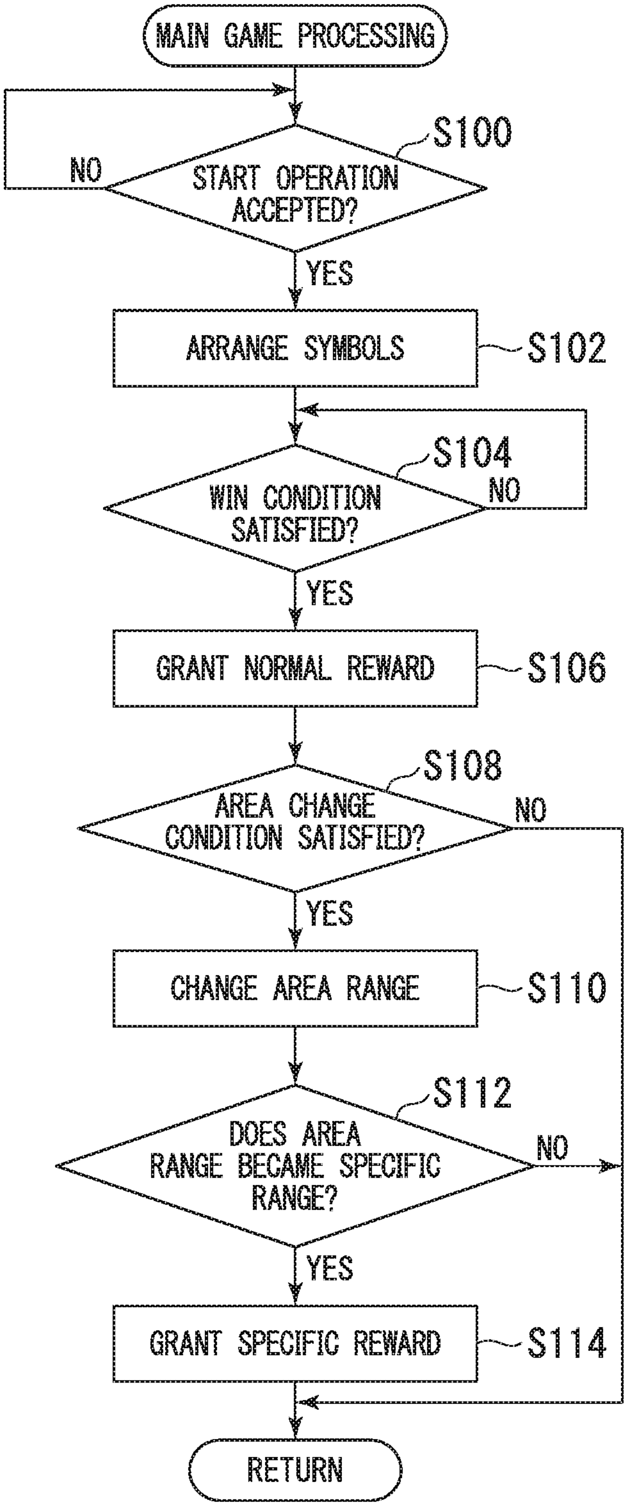
FIG. 11 is flowchart showing an example of the main game processing in a slot machine game according to the first embodiment.

FIG. 11 is a flowchart showing an example of the main game processing of the slot machine game according to the present embodiment. In this case, main game processing refers to processing of the slot machine game in which symbols are arranged and a win determination is made in accordance with the dispositions thereof.

(Main Game Processing Operation)

First, the game control device 110 determines whether or not a game starting operation has been accepted (step S100). A game starting operation is the pressing of the start button 11, the bet button 12 or the like by a player. If the game control device 110 acquires either a game start signal or a bet signal, it determines that a game starting operation has been accepted, and places a plurality of symbols on the symbol-arranging area RH110 within the slot machine screen GS11 (step S102). If, however, the determination is that a game starting operation has not been accepted, the game control device 110 repeats execution of the processing of step S100.

Next, the game control device 110 determines whether or not the win condition has been satisfied, based on the symbols arranged in the symbol-arranging area RH110 (step S104). If the game control device 110 determines that the win condition has been satisfied (YES), it grants a normal reward to the player (step S106) and proceeds to the processing of step S108. If, however, the game control device 110 determines that the win condition has not been satisfied (NO), it proceeds to the processing of step S108 without granting the normal reward to the player.

Next, at step S108, the game control device 110 determines whether or not the area change condition has been satisfied, based on the symbols arranged in the symbol-arranging area RH110. If the game control device 110 determines that the area change condition has not been satisfied (NO), it ends the main game processing without changing the range of the symbol-arranging area RH110. If, however, the game control device 110 determines that the area change condition has been satisfied (YES), it changes the range of the symbol-arranging area RH110 (step S110).

Next, the game control device 110 determines whether or not the range of the symbol-arranging area has become the specific range (step S112). If the game control device 110 determines that the range of the symbol-arranging area has become the specific range (YES), it grants a specific reward to the player (step S114) and ends the main game processing. If, however, the game control device 110 determines that the range of the symbol-arranging area has not become the specific range (NO), it ends the main game processing without granting a specific reward to the player.

(Symbol-Arranging Area Standardizing Processing Operation)

Next, the operation of standardizing processing of the symbol-arranging area RH110 will be described.

Figure 12:
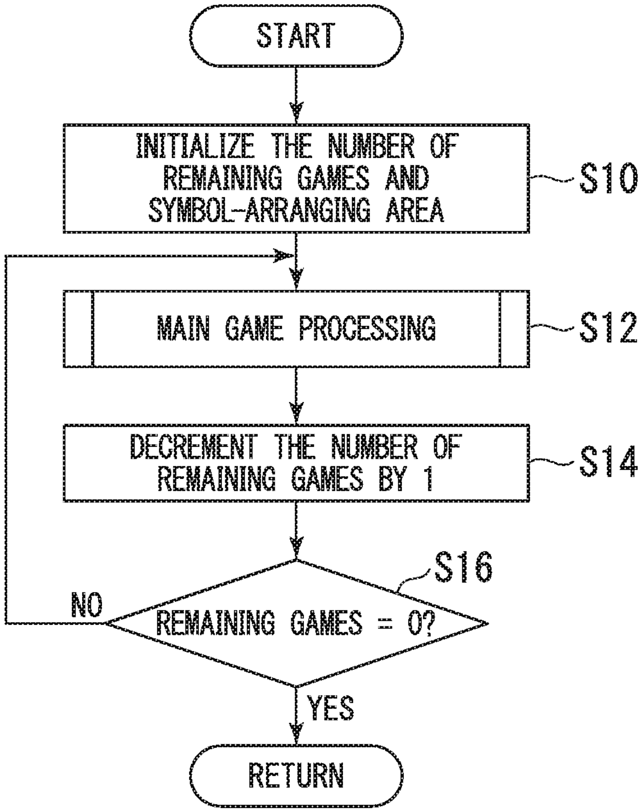
FIG. 12 is a flowchart showing an example of the standardizing processing according to the first embodiment.

FIG. 12 is a flowchart showing an example of the standardizing processing according to the present embodiment. In this case, the example described is one in which the standardizing condition is satisfied by the main game processing being repeated 20 times (that is, one in which the symbol disposition and the win determination processing in accordance with the symbol disposition have been repeated 20 times).

First, the game control device 110 initializes the number of remaining games and the range of the symbol-arranging area RH110 (step S10). For example, the game control device 110 sets the number of remaining games to 20 and sets the range of the symbol-arranging area RH110 to the standard range (the matrix arrangement of three rows and three columns, which are the initial values (refer to (A) in FIG. 3 to FIG. 8).

Next, the game control device 110 executes the main game processing (step S12), which is the main game processing that has been described with standard to FIG. 11. When the main game processing is completed one time, the game control device 110 subtracts one from the number of remaining games (step S14). The game control device 110 then determines whether or not the number of remaining games has reached zero (step S16). If the game control device 110 determines that the number of remaining games has not reached zero (NO), it returns to the processing of step S12 and executes the next main game processing. If, however, the game control device 110 determines that the number of remaining games has reached zero (YES), with the standardizing condition satisfied, it returns processing to step S10. By doing this, even if the range of the symbol-arranging area RH110 is changed in the main game processing, the next main game processing is executed after returning the range of the symbol-arranging area RH110 to the standard range (the matrix-arrangement range of the initial values of three rows and three columns).

Summary of the First Embodiment

As described above, the game apparatus 1 according to the present embodiment has a symbol arrangement device 111 that can place two or more symbols of a plurality of types, a change condition determination device 114, an area range changing device 115, and a specific reward granting device 118. The change condition determination device 114, based on at least a part of the symbols arranged by the symbol arrangement device 111, determines whether or not the area change condition for changing the range of the area in which symbols can be arranged by the symbol arrangement device 111 (for example, the symbol-arranging area RH110) has been satisfied. If the change condition determination device 114 determines that the area change condition has been satisfied, the area range changing device 115 changes the range of the symbol-arranging area RH110. The specific reward granting device 118 then grants a specific reward, with the range of the symbol-arranging area RH110 having become the specific range as at least a condition.

Because the game apparatus 1 enables the player to intuitively grasp how long it is until obtaining a specific reward, based on the change of the range of the symbol-arranging area RH110, the feeling of expectation with respect to the specific reward can be heightened in a stepwise manner.

The change of the range of the symbol-arranging area RH110 is, for example, an increase or decrease of the surface area of the range or movement of the position of the range. The game apparatus 1, by changing the range of the symbol-arranging area RH110, can change the number of symbols that can be arranged.

The specific reward granting device 118 may grant a specific reward with the condition that the range of the symbol-arranging area RH110 has become the specific range, or may grant a specific reward with not only the condition that the range of the symbol-arranging area RH110 has become the specific range but also with an additional condition. For example, after the range of the symbol-arranging area RH110 becomes the specific range, the specific reward granting device 118 may grant a specific reward with the condition, for example, of a specific type of symbol being arranged in the range of the symbol-arranging area RH110 or a specific type of symbol being in a prescribed disposition state in the symbol-arranging area RH110.

The change condition determination device 114 makes at least a part of the symbols arranged by the symbol arrangement device 111 being in a prescribed combination at least one area change condition.

The area range changing device 115 may, in accordance with the number of combinations of prescribed symbols that occur, change the range of the area in which symbols can be arranged (for example, the symbol-arranging area RH110).

The area range changing device 115 may, by changing the range of the area in which symbols can be arranged (for example, the symbol-arranging area RH110), change the positions in which symbols can be arranged. In this case, although the number of symbols that can be arranged does not change, the positions in which symbols can be arranged change.

The game apparatus 1 may have an area range standardizing device 116 that, if the standardizing condition is satisfied, makes the range of the area in which symbols can be arranged (for example, the symbol-arranging area RH110) the standard range. For example, the specific reward granting device 118 may grant a specific reward, with the range of the symbol-arranging area RH110 being the specific range as at least a condition before the above-noted standardizing condition is satisfied. Because the game apparatus 1 can make it difficult for the range of the symbol-arranging area RH110 to become the specific range, this avoids it becoming too easy for the player to obtain a specific reward.

For example, the area range standardizing device 116 makes the arrival of a prescribed time at least one of the above-noted standardizing conditions. Because the game apparatus 1 can return the range of the symbol-arranging area RH110 to the standard range at a prescribed time, this can avoid the player too easily obtaining a specific reward.

Specifically, the area range standardizing device 116 determines that the prescribed time has arrived when symbol-arranging has been done by the symbol arrangement device 111 a prescribed number of times. Because the game apparatus 1 can return the range of the symbol-arranging area RH110 to the standard range each time symbol placement is done a prescribed number of times, this can avoid the player too easily obtaining a specific reward.

The standardizing condition may be based on the elapsed time within a game. That is, the area range standardizing device 116 may return the range of the symbol-arranging area RH110 to the standard range when a prescribed amount of time has elapsed within the game.

The game apparatus 1 has an area range determination device 117 that determines whether or not the range of an area in which symbols can be arranged (for example, the symbol-arranging area RH110) has become the specific range. The specific reward granting device 118 grants a specific reward, with the area range determination device 117 determining that the range of the symbol-arranging area RH110 has become the standard range as at least a condition.

Because the game apparatus 1 can grant a specific reward with the range of the symbol-arranging area RH110 being the specific range as at least a condition, the feeling of expectation by the player with respect to the specific reward can be heightened in a stepwise manner.

For example, the area range determination device 117 may determine whether or not the range of the area in which symbols can be arranged (for example, the symbol-arranging area RH110) has become the specific range before the above-noted standardizing condition has been satisfied. Because the game apparatus 1 can make it difficult for the range of the symbol-arranging area RH110 to become the specific range, this can avoid the player too easily obtaining a specific reward.

Also, for example, the area range determination device 117 determines that the range of the area in which symbols can be arranged (for example the symbol-arranging area RH110) has become the specific range if it is a prescribed number of rows and/or a prescribed number of columns. Because the game apparatus 1 establishes the range of the symbol-arranging area RH110 in which the player can obtain a specific reward as a range made up of a prescribed number of rows and/or a prescribed number of columns, this can enable the player to intuitively grasp how long it is until obtaining a specific reward.

The specific range may be a range in which a prescribed number of symbols can be arranged. For example, if a prescribed number of symbols can be arranged in the range of the area in which symbols can be arranged (for example the symbol-arranging area RH110), the area range determination device 117 may determine that the range of the symbol-arranging area RH110 has become the specific range.

The specific range may be a range that includes or does not include a specific placement location. For example, if the range of the area in which symbols can be arranged (for example, the symbol-arranging area RH110) includes or does not include a specific placement location, the area range determination device 117 may determine that the range of the symbol-arranging area RH110 has become the specific range.

Second Embodiment

Next, the second embodiment of the present invention will be described.

The basic configuration of the game apparatus of the present embodiment is the same as the configuration of the game apparatus 1 shown in FIG. 1. In the following, the game apparatus of the present embodiment will be referred to as the game apparatus 1A. Because the game processing differs from the first embodiment, the description will be of the game processing and the functional configuration that executes the game processing.

(Game Overview)

First, an overview of the game according to the present embodiment will be described.

Figure 13:
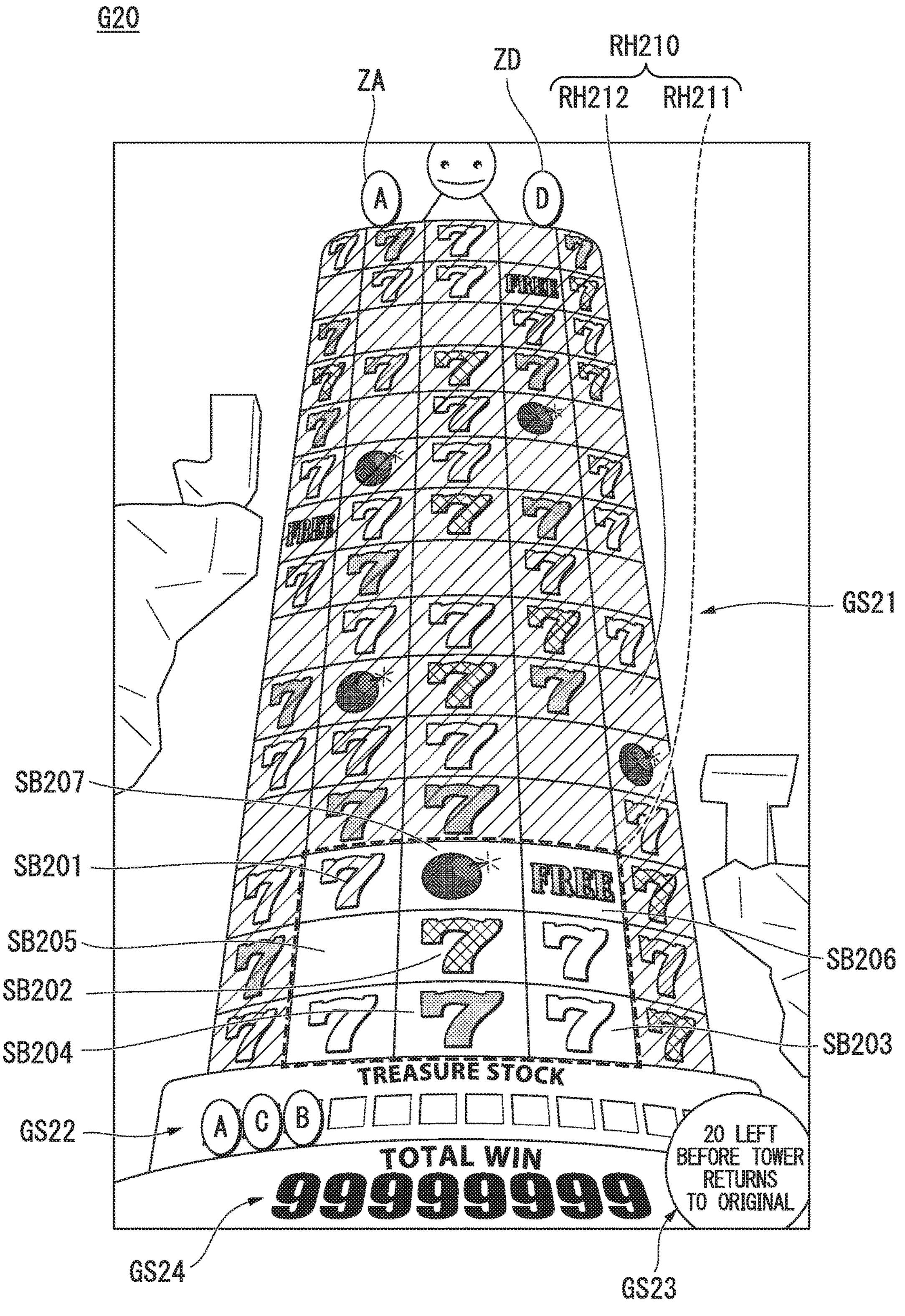
FIG. 13 shows an example of a game screen of a slot machine game according to a second embodiment.

FIG. 13 shows an example of a game screen of a slot machine game according to the present embodiment. The reference symbol G20 in this drawing indicates the overall game screen in the present embodiment and, in the following description, this will be referred to as the game screen G20, regardless of the content displayed thereon. The game screen G20 displays slot machine screen GS21, an item gauge GS22 (TREASURE STOCK), a number of remaining games screen GS23, and a win reward (WIN) screen GS24.

The area indicated by the reference symbol RH210 in the slot machine screen GS21 is the symbol-arranging area. The symbol-arranging area RH210 shown in this drawing is a tower having the shape of a circular tower. This tower is constituted by 15 levels that divide the tower into 15 parts vertically. On each level, the surface on the side that is displayed is divided into five horizontally, and a symbol can be arranged in each of the five divided boxes. That is, in the slot machine screen GS21 of the present embodiment, a maximum of 75 symbols can be arranged on 15 levels (corresponding to rows) of five columns of boxes each. For example, each of the levels of the tower spins and the levels stop spinning, starting from the top level, so that symbols are arranged on each level. In this case, the types of symbols arranged on each level are decided by drawing.

Of the range of the symbol-arranging area RH210 (15 levels, 5 columns), the range indicated by the reference symbol RH211 (3 levels, 3 columns) is the determination area for a win determination (win determination area). Of the range of the symbol-arranging area RH210, the range other than the determination area RH211 (diagonal-line hatched part) is a non-determination area RH212 in which a win determination is not made. For example, the tower constituting the symbol-arranging area RH210 is represented as being a tower made of ice. In the non-determination area RH212 (diagonal-line hatched part) in which the win determination is not made, symbols that are closed off by the ice are represented to appear faint through the ice wall. In contrast, in the range of the determination area RH211 in which a win determination is made, the ice wall is melted, and symbols arranged in that range are represented to appear clearly.

The symbols in the present embodiment include basic symbols, "null" symbols SB205, which have no design added thereto, and special symbols. Examples of basic symbols are the Blue 7 symbol SB201, the Red 7 symbol SB02, the Silver 7 symbol SB203, and the Gold 7 symbol SB204. Examples of special symbols are the FREE symbol SB206 and the "range change" symbol SB207. Each of the levels spins as a reel and, by stopping, displays the symbols (basic symbols or null symbols) in the symbol-arranging area RH210. The timing and the position of stopping are determined by a drawing. Additionally, for each symbol displayed in the symbol-arranging area RH210, a drawing is made to determine whether or not to add a special symbol to each level of the symbol-arranging area RH210. If the drawing result is that a special symbol is to be added, a symbol that has already been displayed stopped is rearranged by a special symbol. The probability of a special symbol appearing may be set for each level. For example, the range change symbol may be set to have a higher probability of appearing, the higher is the level.

In the slot machine game according to the present embodiment, if the deleting condition is satisfied by the symbols that have been arranged in the range of three levels and three columns of the determination area RH211, the symbol that satisfied the deleting condition is deleted. The symbol deleting condition is a condition based on the disposition of symbols that were arranged in the determination area RH211, which is, for example, symbols of the same type in a specific state of disposition. For example, when a row or a column of three or more symbols of the same type (hereinafter sometimes referred to as a connection) occurs in the range of the determination area RH211, in addition to granting a normal reward, the deleting condition is determined to have been satisfied, and those symbols are deleted. Symbols arranged thereabove fall into the locations in which the deleted symbols had been arranged, after which a win determination and deleting condition determination are again made. If the deleting condition is satisfied (if a connection occurs) after the falling of symbols, those symbols are also deleted, and successive symbol deletion continues until a disposition state occurs in which the deleting condition is not satisfied. The "null" symbol SB205 is represented as a block of ice that, for example, disappears if it falls three times. If the win condition is satisfied by at least a part of the symbols arranged in the range of the determination area RH211, the player is granted a normal reward. The win condition is, for example, the occurrence of the above-noted connection, and the disbursement that is granted as a normal reward changes, depending on the type and number of the symbols between which a connection occurred and the number of symbols in the chain. In this manner, although each level spins as a reel, the symbols constituting the reel dynamically change in accordance with deletions and disappearance of symbols.

Figures 14, 15, 16:
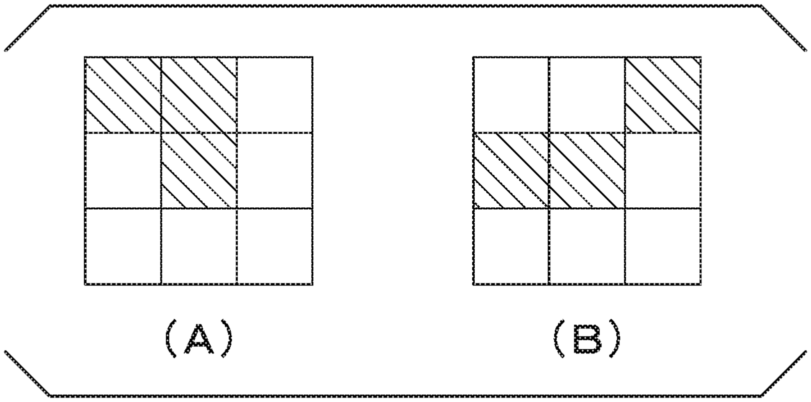
FIG. 14 is a drawing describing the manner in which symbols that are to be connected are arranged.
FIG. 15 shows an example of disbursements as normal rewards.
FIG. 16 shows an example of the setting of the values of items.

FIG. 14 describes the disposition state of symbols forming a connection. In this drawing, the boxes with the diagonal-line hatching are populated by symbols of the same type. In the symbol disposition state shown at (A), because there are at least three symbol joined either vertically or horizontally, a connection is established. In the symbol disposition state shown at (B), however, because two symbols are joined horizontally, a connection is not established.

FIG. 15 shows an example of disbursements as the normal reward. The example illustrated shows the disbursements granted as a normal reward when connections occur. For example, the disbursements are set to increase in the sequence of Blue 7, Red 7, Silver 7, and Gold 7 as the type of symbols establishing the connection. Also, the greater is the size of the connection (number of joined symbols), the higher is set the disbursement.

Returning to FIG. 13, items (refer to reference symbols ZA and ZD) are displayed at the uppermost part (above the uppermost level) of the symbol-arranging area RH210. The items indicate a specific value that serves as a part of the specific reward granted in the jackpot, which will be described later. An item obtained by a player during a game is accumulated in the item gauge GS22, and a part of the specific reward is established based on the accumulated items and the items displayed in the uppermost part of the symbol-arranging area RH210. For example, there are the plurality of types of items A, B, C, and D, with different values. FIG. 16 shows an example of the setting of values of each item. In the example illustrated, the value of item D is set to be the highest value, item C is the next highest value, item B is the next highest value after that, and item A is set to have the lowest value.

(Special Symbols)

Next, the processing when a special symbol appears in the range of the determination area RH211 will be described. In the range of the symbol-arranging area RH210, when the symbol deleting condition is no longer satisfied (for example, when a connection no longer occurs), a determination is made as to whether or not a special symbol has appeared in the determination area RH211. If a special symbol has appeared, processing according to the special symbol that appeared is performed.

(Processing when a "Range Change" Symbol Appears)

First, the processing performed when a "range change" symbol appears will be described. FIG. 17 describes the processing when a "range change" symbol has appeared, in which (A) shows how the "range change" symbol SB207 appears in the determination area RH211. If a "range change" symbol SB207 appears in the determination area RH211, an explosion presentation is made, such as shown in (B), the symbol arranged in the level in which the "range change" symbol SB207 appeared disappearing (being deleted). As shown in (C) and (D), the level in which the "range change" symbol SB207 appeared is itself blown away (deleted), and the levels thereabove drop by one level. That is, the range of the symbol-arranging area RH210 changes by the deletion on one level.

FIG. 18 describes an example in which the range of the symbol-arranging area RH210 becomes a specific range by the appearance of a "range change" symbol, in which (A) shows how the "range change" symbol SB207 has appeared in the determination area RH211 of the symbol-arranging area RH210, which is four levels of five columns. The specific range in the present embodiment is taken to be a range of three or fewer levels. If a "range change" symbol SB207 appears in the determination area RH211, an explosion presentation is made, such as shown in (B), and, as shown in (C) and (D), the level in which the "range change" symbol SB207 appeared is itself blown away (deleted), and the levels thereabove drop by one level. Then, as shown in (D), the range of the symbol-arranging area RH210 becomes the specific range (for example a range of three or fewer levels), so that the jackpot is initiated and a specific reward is granted. The jackpot will be described later in detail.

If the range of the symbol-arranging area RH210 does not become the specific range before the standardizing condition being satisfied, the range of the symbol-arranging area RH210 returns to the initial values (15 levels, five columns). For example, the standardizing condition is the repetition of the main game processing (slot machine game processing) 20 times (that is, the processing of the win determination (up until the end of a chain in the case of a chain) 20 times, in accordance with the disposition of symbols. The number of remaining games screen GS23 shown in FIG. 13 displays the number of games remaining until the satisfying of the standardizing condition. In this case, the relative brightness of the screen can be changed, or the color can be changed, or the presentation of the game can be changed, in accordance with the number of remaining games until the satisfying of the standardizing condition, thereby enabling a change of the game presentation.

The standardizing condition may be based on the elapsed time within the game. For example, timekeeping of the elapsed time may be started from a prescribed point in time and, when a prescribed amount of time has elapsed, the range of the symbol-arranging area RH210 may be returned to the initial values (15 levels, five columns). In this case, obtaining a jackpot before the prescribed amount of time elapses is a main object of this game.

If a plurality of "range change" symbols appear simultaneously on different levels, both the plurality of levels in which the "range change" symbols appeared and the symbols arranged in that plurality of levels are deleted. If a level is deleted by a "range change" symbol SB207, an item is accumulated in the item gauge GS22 with a prescribed probability. The probability of an item being accumulated is different, depending on the number of deleted levels. The more levels that are deleted, the greater may be the probability of the item being accumulated. Also, the greater is the bet amount, the easier it may be for a high-value item to be accumulated. FIG. 19 shows an example of the probabilities of items accumulating. The example illustrated shows the probabilities of an item accumulating versus the number of levels simultaneously deleted. The probability of an item accumulating is set higher, the greater is the number of levels that were simultaneously deleted.

Up to a maximum of 12 items are accumulated in the item gauge G22. In the state in which 12 items have accumulated in the item gauge GS22, if the player obtains a further item, an item is pushed out and disappears, starting from the first item accumulated, the obtained item accumulating in its place. Additionally, the player is granted a reward based on the pushed out item.

(Processing When a FREE Symbol Appears)

Next, the processing when a FREE symbol appears will be described. If a FREE symbol appears in the determination area RH211, the range of the determination area RH211 changes dynamically. For example, if a FREE symbol appears in the range of the determination area RH211, a free attack game in which the range of the determination area RH211 is expanded starts. In the free attack game, for example, the entire symbol-arranging area RH210 at that point in time becomes the determination area RH211. That is, the range of the determination area RH211 expands to be the entire range of the symbol-arranging area RH210. Also, in this case, although the example to be described is one in which the range of the determination area RH211 expands to the entire symbol-arranging area RH210, expansion may be done to a part of the range of the symbol-arranging area RH210.

Figure 20:
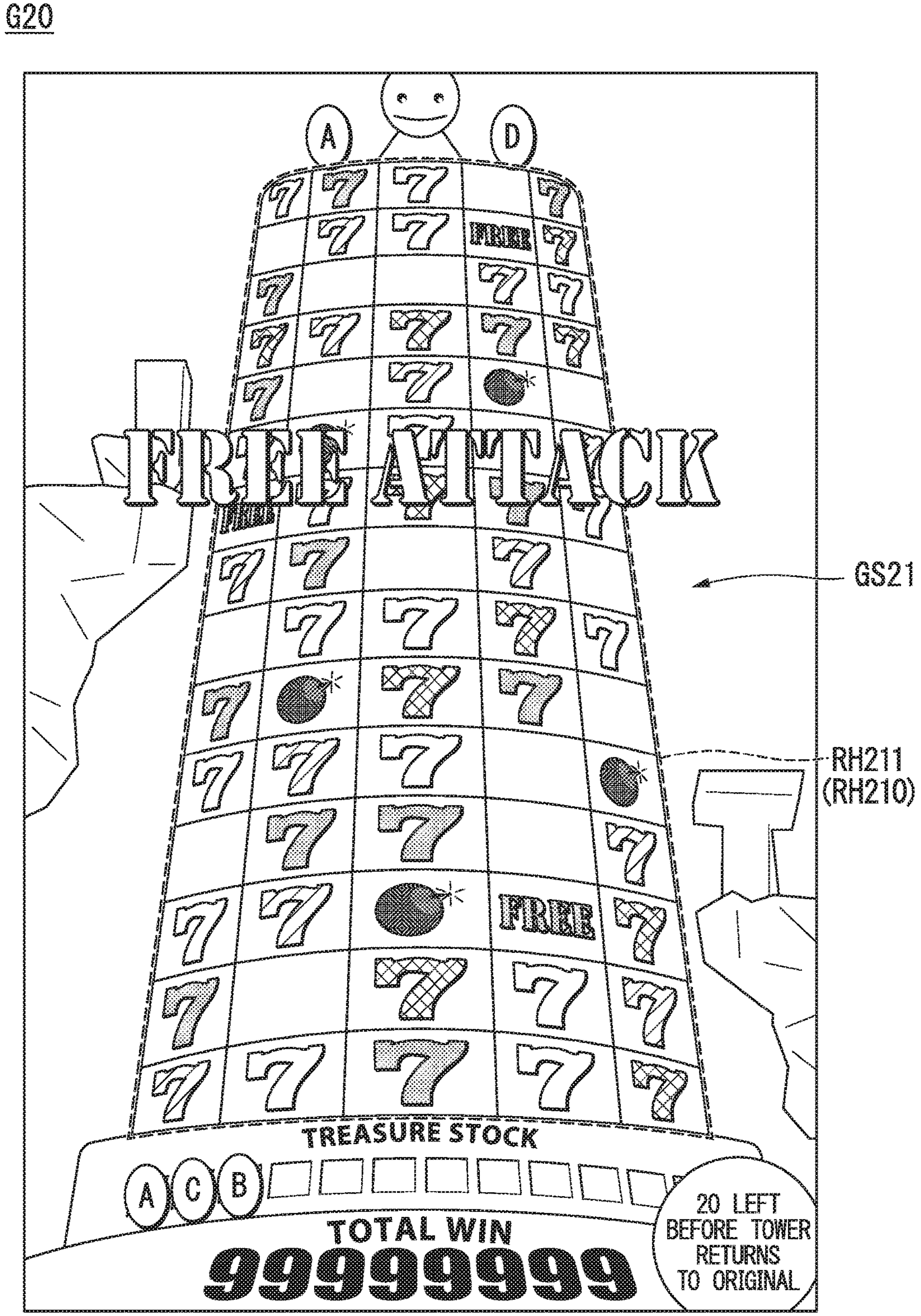
FIG. 20 shows an example of a game screen of a free attack game.

FIG. 20 shows an example of the game screen of a free attack game. In the illustrated game screen G20 of the free attack game the range of the symbol-arranging area RH210 is 15 levels and five columns, and that entire range becomes the determination area RH211. In the free attack game, by the range of the determination area RH211 expanding, it becomes easier for a level to be deleted by a "range change" symbol, so that the expectation of a player obtaining a jackpot is increased.

(Jackpot Processing)

If the range of the symbol-arranging area RH210 becomes the specific range, the player is granted a specific reward. A specific reward is, for example, a special reward obtaining a disbursement higher than the normal reward, this sometimes being referred to as the jackpot reward. The specific reward may be a fixed reward or a variable reward, or may be a combination thereof. For example, the specific reward may be a progressive reward. The specific reward may be the sum of a fixed reward and a variable reward based on accumulated items. The variable award based on items is established based on items accumulated in the item gauge GS22 and items displayed at the uppermost part of the symbol-arranging area RH210.

Figure 21:
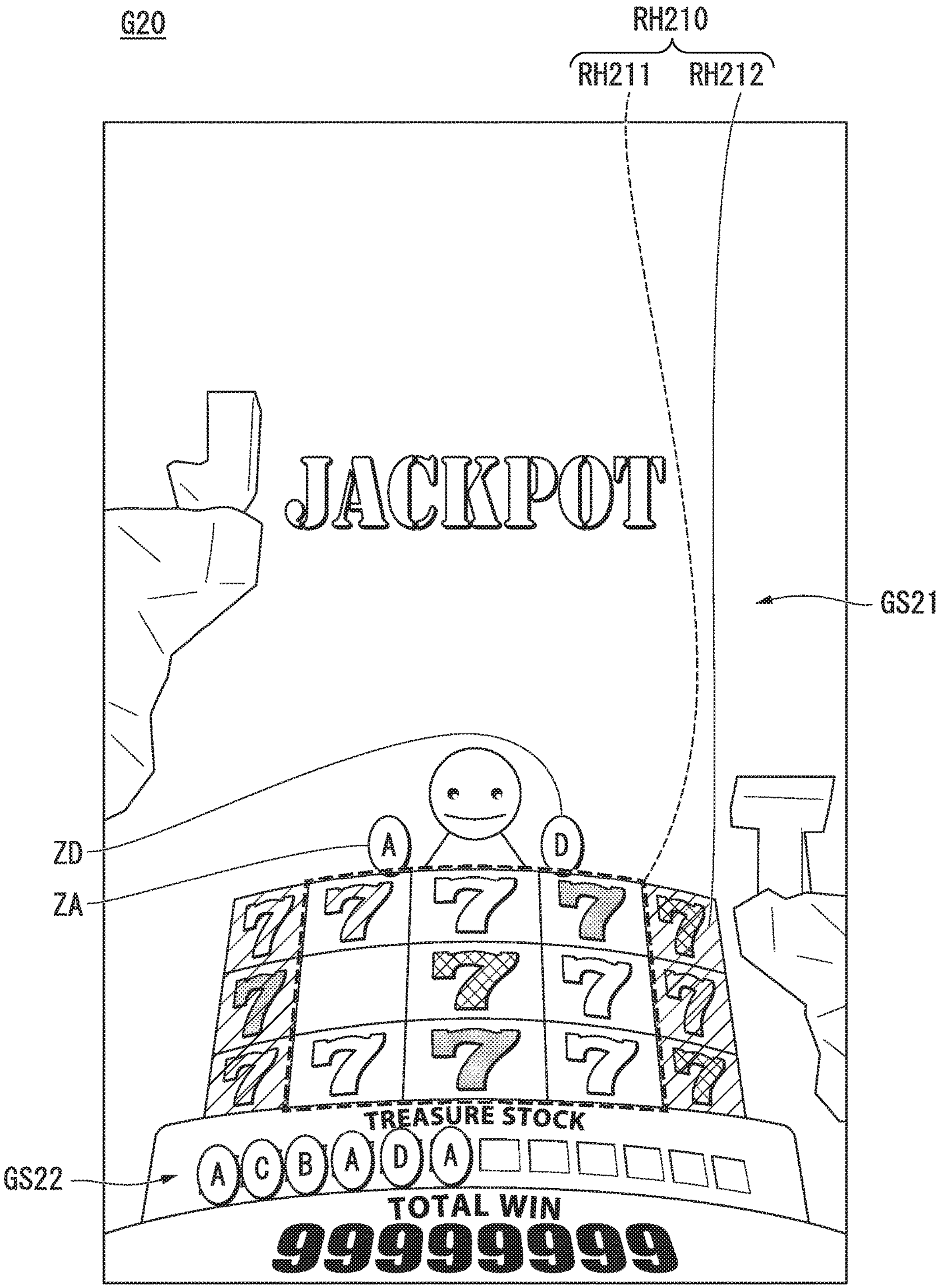
FIG. 21 shows an example of a jackpot game screen.

FIG. 21 shows an example of a jackpot game screen of the jackpot. In the illustrated jackpot game screen G20, the symbol-arranging area RH210 range is three levels and five columns, and because this has changed to be the specific range (for example a range of three or fewer levels), the specific reward is granted. Item A and item D, which are items to be added to the fixed reward, are displayed in the uppermost part of the symbol-arranging area RH210 (refer to the reference symbols ZA and ZD). In this case, of the items accumulated in the item gauge GS22, the variable reward based on item A and item D is added to the fixed reward. For example, the variable reward based on the value of three items A and the value of one item D stored in the item gauge GS22, is added to the fixed reward. The items A and item D to be added to the fixed reward are deleted from the item gauge GS22. Items remaining in the item gauge GS22 are carried over to enable their use in subsequent games. After granting the specific reward, the range of the symbol-arranging area RH210 returns to the initial values (15 levels, five columns).

If two items of the same type are displayed at the uppermost part of the symbol-arranging area RH210, a variable reward based on two times the value of that type of item is added to the fixed reward. An item having a special value that adds to the fixed reward a variable reward based on the values of all the types of items may be displayed at the uppermost part of the symbol-arranging area RH210. If the item having this special value is displayed at the uppermost part of the symbol-arranging area RH210, a variable reward based on the value of all items accumulated in the item gauge GS22 is added to the fixed reward.

(Functional Configuration of Processing Executed by the MPU)

Next, the functional configuration of the MPU 17 provided in the game apparatus 1A of the present embodiment as a game control device executing game processing based on a program for controlling a game will be described.

Figure 22:
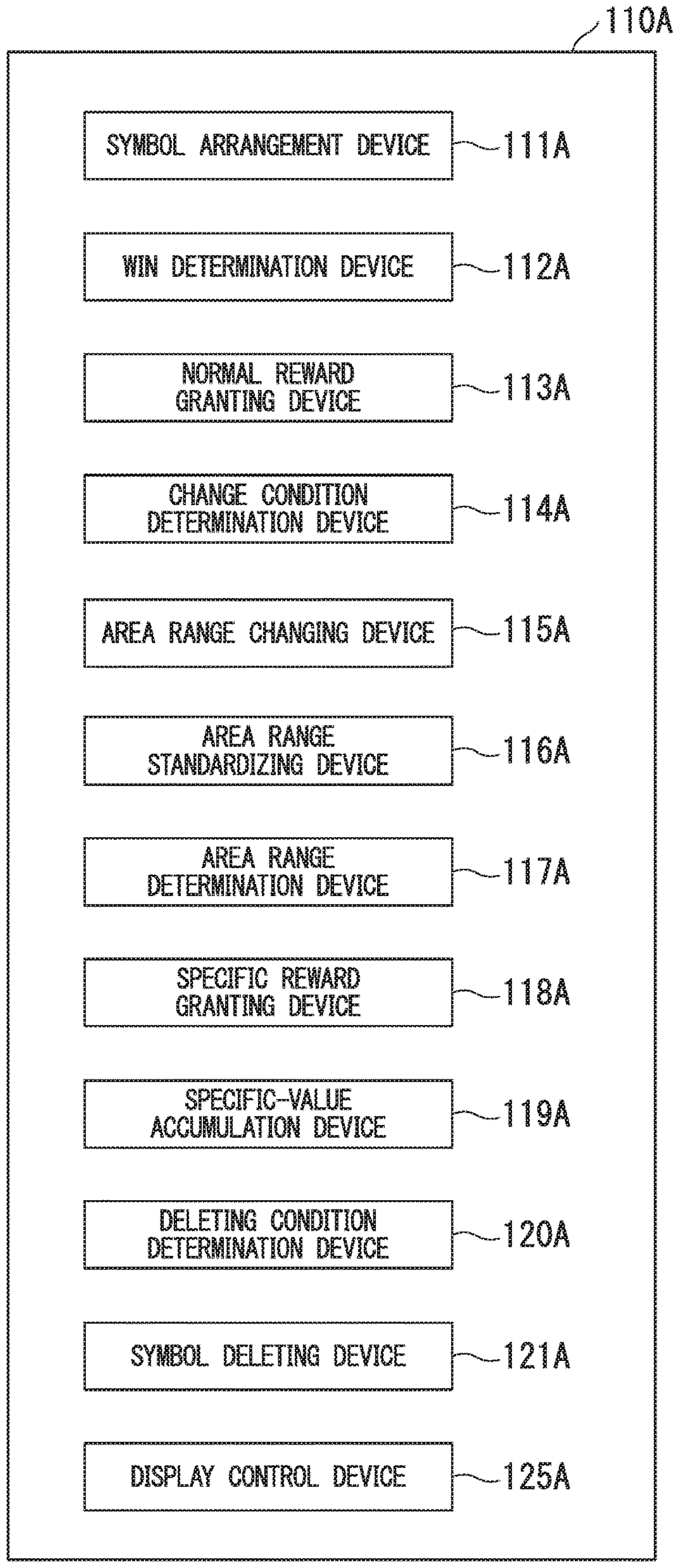
FIG. 22 shows an example of the functional configuration of a game control device according to the second embodiment.

FIG. 22 shows an example of the functional configuration of the game control device game control device 110A according to the present embodiment. The illustrated game control device 110A has a symbol arrangement device 111A, a win determination device 112A, a normal reward granting device 113A, a change condition determination device 114A, an area range changing device 115A, an area range standardizing device 116A, an area range determination device 117A, a specific reward granting device 118A, a specific-value accumulation device 119A, a deleting condition determination device 120A, a symbol deleting device 121A, and a display control device 125A.

The symbol arrangement device 111A corresponds to the symbol arrangement device 111 shown in FIG. 9 and, in the present embodiment, places a plurality of symbols in the symbol-arranging area RH210 within the slot machine screen GS21. For example, the symbol arrangement device 111A places in the symbol-arranging area RH210 a plurality of symbols selected by drawing from among the basic symbols Blue 7, Red 7, Silver 7, and Gold 7, the "null" symbol, and specific symbols (the "range change" symbol, and the FREE symbol).

The win determination device 112A corresponds to the win determination device 112 shown in FIG. 9 and, in the present embodiment, based on the disposition of a plurality of symbols in the determination area RH211 within the symbol-arranging area RH210, performs a win determination by whether or not the win condition has been satisfied. That is, the win determination device 112A determines whether or not the win condition has been satisfied, based on at least a part of the symbols that were arranged by the symbol arrangement device 111A.

The normal reward granting device 113A corresponds to the normal reward granting device 113 shown in FIG. 9 and, in the present embodiment, grants a normal reward to the player if the determination is made by the win determination device 112A that the win condition has been satisfied.

The change condition determination device 114 corresponds to the change condition determination device 114 shown in FIG. 9 and, in the present embodiment, determines whether or not the area change condition for changing the range of the symbol-arranging area RH210 into which the symbol arrangement device 111A places symbols has been satisfied, based on at least a part of the symbols arranged by the symbol arrangement device 111A. For example, the change condition determination device 114A makes the inclusion of a "range change" symbol in the symbols arranged in determination area RH211 by the symbol arrangement device 111A (at least a part of the symbols arranged by the symbol arrangement device 111A) at least one area change condition.

The change condition determination device 114A, of the range of the symbol-arranging area RH210, may dynamically change the range of the area for determining whether or not the area change condition has been satisfied (that is, the determination area RH211). For example, the change condition determination device 114A may make the inclusion of a FREE symbol in the symbols arranged in the determination area RH211 by the symbol arrangement device 111A one condition for changing the range of the determination area RH211. In this case, if a FREE symbol has been arranged in the determination area RH211, the change condition determination device 114A may start the free attack game and may expand the range of the determination area RH211 to the range of the symbol-arranging area RH210. In this case, although the example shown is one in which the determination area RH211 in which a win determination is made and the determination area RH211 in which a determination is made of whether or not the area change condition is satisfied are the same range, they need not be the same range, and different ranges within the symbol-arranging area RH210 may be set as the respective determination areas.

The area range changing device 115A corresponds to the area range changing device 115 shown in FIG. 9 and, in the present embodiment, changes the range of the symbol-arranging area RH210 if the change condition determination device 114A determines that the area change condition has been satisfied. For example, if a "range change" symbol is arranged in the determination area RH211, the area range changing device 115A deletes the level into which the "range change" symbol has been arranged and lowers the levels thereabove by one level, thereby changing the range of the symbol-arranging area RH210 (refer to FIG. 17 and FIG. 18). The area range changing device 115A changes the range of the symbol-arranging area RH210 in accordance with the number of "range change" symbols that have been arranged. For example, if "range change" symbols have been arranged in a plurality of levels, the area range changing device 115A deletes the plurality of levels. In this manner, the area range changing device 115A changes the range of the symbol-arranging area RH210, thereby changing the number of symbols that can be arranged.

The area range standardizing device 116A corresponds to the area range standardizing device 116 shown in FIG. 9 and, in the present embodiment, makes the range of the symbol-arranging area RH210 the standard range if the standardizing condition has been satisfied. In this case, the standard range is different from the specific range, and is also the range to be used as the reference of the symbol-arranging area RH210. For example, the standard range is the range of the symbol-arranging area RH210 (15 levels, five columns) at the start of the game, such as shown in FIG. 13. For example, if the main game processing (slot machine game processing) has been repeated 20 times, the area range standardizing device 116A returns (initializes) the range of the symbol-arranging area RH210 to the range at the start of the game (the initial values of 15 levels and five columns).

The standardizing condition may be based on the amount of elapsed time in the game. For example, the area range standardizing device 116A may start timekeeping of the elapsed time from a prescribed point in time and, when the prescribed amount of time has elapsed, may return the range of the symbol-arranging area RH210 to the initial values (15 levels, five columns).

The area range determination device 117A corresponds to the area range determination device 117 shown in FIG. 9 and, in the present embodiment, determines whether or not the range of the symbol-arranging area RH210 is changed to the specific range (for example, three or fewer levels).

The specific reward granting device 118A corresponds to the specific reward granting device 118 shown in FIG. 9 and, in the present embodiment, grants a specific reward, with at least the condition that the range of the symbol-arranging area RH210 has become the specific range, based on the result determined by the area range determination device 117A. That is, the specific reward granting device 118A grants a specific reward with at least the condition that the range of the symbol-arranging area RH210 has been determined by the area range determination device 117A to have become the specific range. For example, the specific reward granting device 118A grants a specific reward with at least the condition that the range of the symbol-arranging area RH210 had become the specific range before the standardizing condition has been satisfied. The specific reward granting device 118A adds as a part of the specific reward a reward (variable reward) based on the items (specific value) accumulated in the item gauge GS22.

The specific-value accumulation device 119A accumulates a plurality of types of different specific values. For example, the specific-value accumulation device 119A accumulates in the item gauge GS22 a plurality of items having different values (items A, B, C, and D) as the above-noted specific values.

The deleting condition determination device 120A determines whether or not the symbol deleting condition has been satisfied, based on at least a part of the symbols arranged in the symbol-arranging area RH210. For example, the deleting condition determination device 120A determines whether or not the deleting condition has been satisfied, based on the disposition of symbols arranged in the determination area RH211. Specifically, if a connection occurs in the disposition state of symbols arranged in the determination area RH211, the deleting condition determination device 120A determines that the deleting condition has been satisfied. If, however, a connection has not occurred in the disposition state of symbols arranged in the determination area RH211, the deleting condition determination device 120A determines that the deleting condition has not been satisfied.

The symbol deleting device 121A deletes symbols that result in satisfying the deleting condition from the determination area RH211 if the deleting condition determination device 120A has determined that the symbol deleting condition has been satisfied. When this is done, the symbol deleting device 121A drops and moves symbols arranged above the locations from which symbols have been deleted.

The display control device 125A corresponds to the display control device 125 shown in FIG. 9, generates image data of a game screen to be displayed on the display device 14, and outputs to the display device 14 an image signal based on the generated image data. In the present embodiment, for example, the display control device 125A displays on the display device 14 game screens G20 (for example, FIG. 13, FIG. 20, and FIG. 21) that include the slot machine screen GS21, in which a plurality of symbols are arranged by the symbol arrangement device 111A.

(Operation of Game Processing)

Next the operation of game processing according to the present embodiment will be described.

Figure 23:
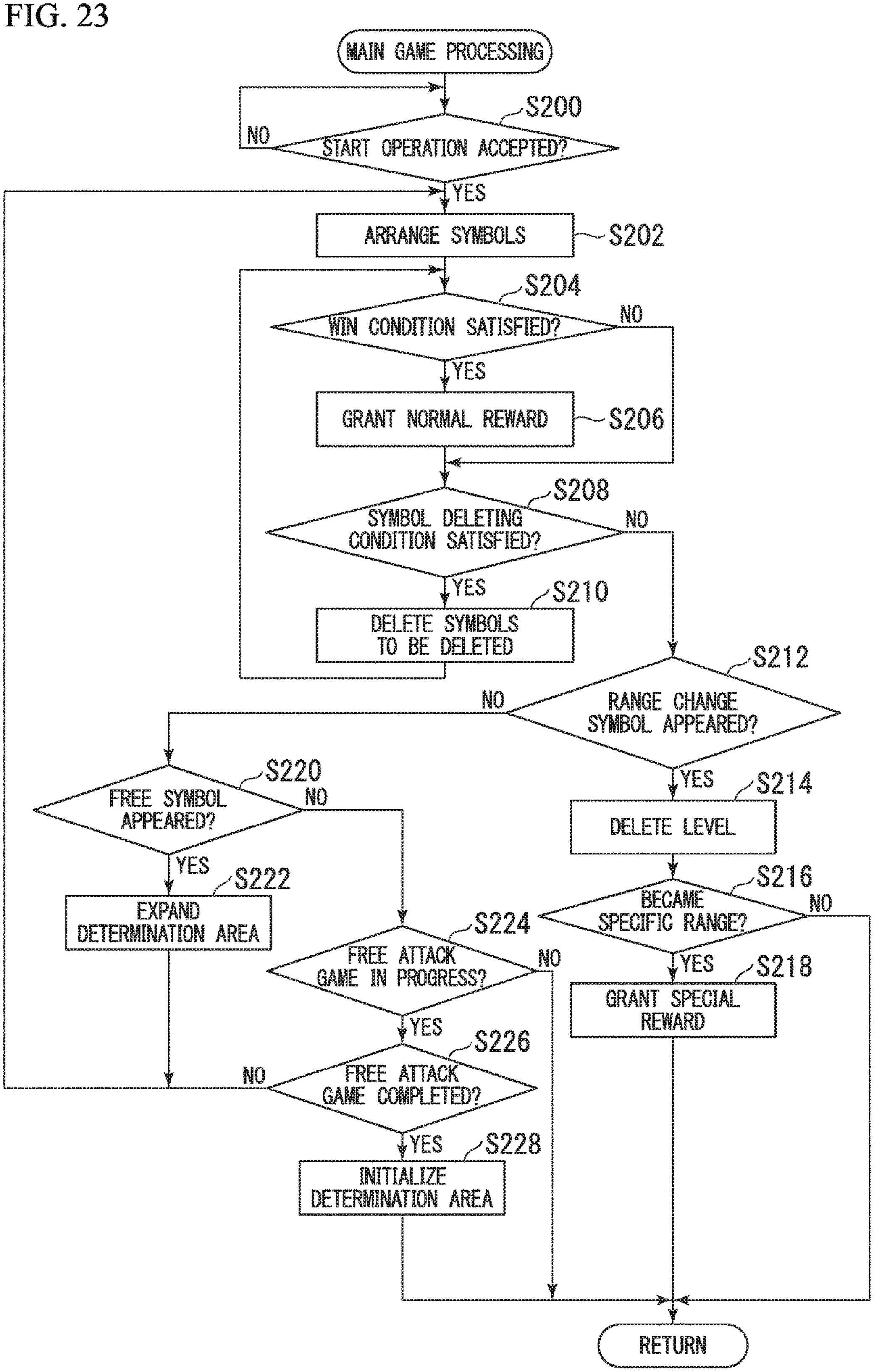
FIG. 23 is a flowchart showing an example of the main game processing of a slot machine game according to the second embodiment.

FIG. 23 is a flowchart showing an example of the main game processing (slot machine game processing) of a slot machine game according to the present embodiment.

(Main Game Processing Operation)

First, the game control device 110A determines whether or not a game starting operation has been accepted (step S200). A game starting operation is the pressing of the start button 11, the bet button 12 or the like by a player. If the game control device 110A acquires either a game start signal or a bet signal, it determines that a game starting operation has been accepted, and places a plurality of symbols in the symbol-arranging area RH210 within the slot machine screen GS21 (step S202). If, however, the determination is that a game starting operation has not been accepted, the game control device 110A repeats execution of the processing of step S200.

Next, the game control device 110A determines whether or not the win condition has been satisfied, based on at least a part of the symbols arranged in the symbol-arranging area RH210 (step S204). If the game control device 110A determines that the win condition has been satisfied (YES), it grants a normal reward to the player (step S206) and proceeds to the processing of step S208. If, however, the game control device 110A determines that the win condition has not been satisfied (NO), it proceeds to the processing of step S208 without granting the normal reward to the player.

Next, at step S208, the game control device 110A determines whether or not the symbol deleting condition has been satisfied, based on at least a part of the symbols arranged in the symbol-arranging area RH210. If the game control device 110A determines that the symbol deleting condition has been satisfied (YES), it deletes the symbols to be deleted (the symbols with which the deleting condition has been satisfied) and drops symbols from thereabove down (step S210). The game control device 110A then returns to the processing of step S204 and repeats the processing of step S204 to step S210 until the symbol deleting condition is no longer satisfied. If, however, the game control device 110A determines at step S208 that the symbol deleting condition has not been satisfied (NO), it proceeds to the processing of step S212.

Next, at step S212, the game control device 110A determines whether or not the area change condition of the symbol-arranging area RH210 has been satisfied, based on at least a part of the symbols arranged in the symbol-arranging area RH210. For example, the game control device 110A determines whether or not the area change condition in the symbol-arranging area RH210 has been satisfied, according to whether or not a "range change" symbol has appeared in the determination area RH211. If the game control device 110A determines that a "range change" symbol has appeared (that the area change condition in the symbol-arranging area RH210 has been satisfied) (YES), it deletes the level in which the "range change" symbol appeared and all of the symbols thereon, thereby changing the range of the symbol-arranging area RH210 (step S214). If the range of the symbol-arranging area RH210 is changed by a "range change" symbol, the game control device 110A accumulates an item in the item gauge GS22 based on a prescribed probability.

Next, the game control device 110A determines whether or not the range of the symbol-arranging area RH210 has become the specific range (step S216). If the game control device 110A determines that the range of the symbol-arranging area RH210 has become the specific range (YES), it grants a specific reward to the player (step S218) and ends the main game processing. If, however, the game control device 110A determines that the range of the symbol-arranging area RH210 has not become the specific range (NO), it ends the main game processing without granting the specific reward to the player.

At step S212, if the game control device 110A determines that a "range change" symbol has not appeared (NO) (that the area change condition in the symbol-arranging area RH210 has not been satisfied), it determines whether or not a FREE symbol has appeared (step S220). The game control device 110A determines whether or not the area change condition in the determination area RH211 has been satisfied by whether or not the FREE symbol has appeared.

If the game control device 110A determines that the FREE symbol has appeared (YES) (that the area change condition in the determination area RH211 has been satisfied), it expands the range of the determination area RH211 to the range of the symbol-arranging area RH210 and returns to the processing of step S202 (step S222), thereby starting the free attack game and performing the main game processing with the range of the determination area RH211 expanded. When the free attack game starts, symbol placement is done without passing through the processing of step S200. That is, in the free attack game, symbol placement is done without the condition of a player bet.

If, however, at step S220 the game control device 110A determines that the FREE symbol has not appeared (NO) (that the area change condition in the determination area RH211 has not been satisfied), it determines whether or not the free attack game is being executed (step S224). If the game control device 110A determines that the free attack game is not being executed (NO), it ends the main game processing. If the game control device 110A determines that the free attack game is being executed (YES), it determines whether or not the free attack game being executed has been completed an established number of times (step S226). This established number of times is the number of times symbols are arranged within the free attack game, as established by the specifications of the free attack game. If the game control device 110A determines that the free attack game has not been completed the established number of times (NO), it returns to the processing of step S202, and continues the free attack game. If, however, the game control device 110A determines that the free attack game has been completed the established number of times (YES), it initializes the range of the determination area RH211 (returns it to three levels and three columns) and ends the main game processing. This ends the free attack game.

(Operation of Standardizing Processing in the Symbol-Arranging Area)

The operation of standardizing processing of the range of the symbol-arranging area RH210 is the same as the operation of standardizing processing of the range of the symbol-arranging area RH110 according to the first embodiment shown in FIG. 12. For example, each time the main game processing is executed, the game control device 110A subtracts one from the number of remaining games and, if the determination is that the number of remaining games reaches zero (for example, the case in which the main game processing is repeated 20 times), with the standardizing condition satisfied, it sets the range of the symbol-arranging area RH210 to the standard range (the initial values of 15 levels and five columns), thereby initializing it, after which it executes the next main game processing.

As described above, the standardizing condition may be based on an amount of time elapsed in the game. For example, the game control device 110A may start timekeeping of the elapsed time at a prescribed point in time and, when the prescribed time has elapsed, may return the range of the symbol-arranging area RH210 to the standard range (initial values of 15 levels and five columns).

Summary of the Second Embodiment

As described above, the game apparatus 1A according to the present embodiment has a symbol arrangement device 111A that can place two or more symbols of a plurality of types, a change condition determination device 114A, an area range changing device 115A, and a specific reward granting device 118A. The change condition determination device 114A, based on at least a part of the symbols arranged by the symbol arrangement device 111A, determines whether or not the area change condition for changing the area in which symbols can be arranged by the symbol arrangement device 111A (for example, the symbol-arranging area RH210) has been satisfied. If the change condition determination device 114A determines that the area change condition has been satisfied, the area range changing device 115A changes the range of the symbol-arranging area RH210. The specific reward granting device 118A then grants a specific reward, with at least the range of the symbol-arranging area RH210 having become the specific range as a condition.

Because the game apparatus 1A can cause the player to intuitively grasp after how long the player will obtain the specific reward, based on the change of the range of the symbol-arranging area RH210, this enables a stepwise heightening of the feeling of expectation with respect to the specific reward.

The specific reward granting device 118A may grant the specific reward with the range of the symbol-arranging area RH210 having changed to the specific range as a condition, or may grant a specific reward with not only the condition that the range of the symbol-arranging area RH210 has become the specific range but also with an additional condition, For example, after the range of the symbol-arranging area RH210 becomes the specific range, the specific reward granting device 118A may grant a specific reward with the condition, for example, of a specific type of symbol being arranged in the range of the determination area RH211 or a specific type of symbol being in a prescribed disposition state in determination area RH211.

The change condition determination device 114A makes the inclusion of a "range change" symbol (an example of a symbol of a prescribed type) in at least a part of the symbol arranged by the symbol arrangement device 111A (for example the determination area RH211) at least one area change condition (for example the area change condition in the symbol-arranging area RH210). Because the appearance of the "range change" symbol brings about a change of the range of the symbol-arranging area RH210, which leads to the granting of the specific reward, the game apparatus 1A can cause the player to intuitively grasp after how long the specific reward will be obtained.

The area range changing device 115A changes the range of the area in which symbols can be arranged (for example, the symbol-arranging area RH210) in accordance with the number of "range change" symbols (an example of a prescribed type of symbol) that are arranged. Because the game apparatus 1A can delete more levels in the symbol-arranging area RH210, the more levels on which a "range change" symbol appears, it becomes easier for the range of the symbol-arranging area RH210 to become the specific range, enabling an increase in the probability of the player obtaining a specific reward.

By making a display in which the rotation of a plurality of rotatable levels (reels), to each of which are allocated symbols, is stopped, the symbol arrangement device 111A can place a plurality of types of symbols. By deleting a part of the levels (reels) from a plurality of levels (reels), to each of which are allocated symbols, the area range changing device 115A can change (reduce) the range of the area in which symbols can be arranged (for example, the symbol-arranging area RH210). And, by adding a plurality of new levels (reels), to each of which are allocated symbols, the area range changing device 115A may change (increase) the area in which symbols can be arranged (for example, the symbol-arranging area RH210).

The change condition determination device 114A, of the range of the area in which symbols can be arranged (for example, the symbol-arranging area RH210), changes the range of the area (for example, the determination area RH211) in which a determination is made of whether or not the area change condition (for example, the area change condition of the determination area RH211) is satisfied. For example, the change condition determination device 114A, with the condition that a FREE symbol has been arranged in the determination area RH211, expands the range of the determination area RH211 to the range of the symbol-arranging area RH210 (free attack game). Because expanding the range of the determination area RH211 makes it to change the range of the symbol-arranging area RH210 by the appearance of a "range change" symbol, this enables the game apparatus 1A to increase the feeling of expectation by the player with respect to the specific reward.

The determination area RH211 is an area in which a determination is made of whether or not the area change condition is satisfied, and it is also an area in which a determination is made of whether or not the win condition has been satisfied. That is, the win determination device 112A, of the range of the area in which symbols can be arranged (for example, the symbol-arranging area RH210), dynamically changes the range in which a determination is made of whether or not the win condition has been satisfied (for example, the determination area RH211).

The area range changing device 115A, by changing the range of the area in which symbols can be arranged (for example, the symbol-arranging area RH210), changes the number of symbols that can be arranged. By doing this, the game apparatus 1A can grant a specific reward based on the number of symbols that can be arranged. For example, the game apparatus 1A may grant a specific reward if the number of symbols that can be arranged in the range of the symbol-arranging area RH210 is a specific number, is at least a specific number, or is less than a specific number.

The game apparatus 1A also has a specific-value accumulation device 119A that can accumulate a plurality of types of items (examples of specific values) having different values. For example, the game apparatus 1A can select one or more types of item from among the accumulated items and make the selection a part of the specific reward.

For example, the items accumulated by the specific-value accumulation device 119A are items that the player has obtained and are displayed by the item gauge GS22 on the game screen G20. The specific reward granting device 118A selects one or more types of the accumulated items and makes the selection a part of the specific reward. For example, the types of items selected are displayed at the uppermost part of the symbol-arranging area RH210. The items remaining in the item gauge GS22 are carried over and usable in subsequent games. The items accumulated in the item gauge GS22 are carried over to subsequent games even if the standardizing condition is satisfied.

By doing this, the game apparatus 1A can increase the value of the specific reward based on items that have been obtained during the game, thereby enabling a heightening of the feeling by the player of expectation with respect to the specific reward.

The game apparatus 1A may have an area range standardizing device 116A that makes the range of an area in which symbols can be arranged (for example, the symbol-arranging area RH210) the specific range if the standardizing condition is satisfied. For example, the specific reward granting device 118A may grant a specific reward with at least the condition that the range of the symbol-arranging area RH210 has become the specific range before the standardizing condition has been satisfied. By doing this, the game apparatus 1A can make it difficult for the range of the symbol-arranging area RH210 to become the specific range, thereby avoiding the player too easily obtaining the specific reward.

For example, the area range standardizing device 116A makes the arrival of a prescribed time at least one standardizing condition. Because the game apparatus 1A can return the range of the symbol-arranging area RH210 to the standard range at a prescribed time, it can avoid the player too easily obtaining the specific reward.

Specifically, if symbol-arranging is done by the symbol arrangement device 111A a prescribed number of times, the area range standardizing device 116A determines that the prescribed time has arrived. Because the range of the symbol-arranging area RH210 can be returned to the specific range each time symbol placement is done a prescribed number of times, the game apparatus 1A can avoid the player too easily obtaining the specific reward.

During a free attack game, the number of times symbols are arranged for the purpose of determining the standardizing condition is not counted. For example, the processing is made different between the state in the normal game, in which symbols are arranged with the condition of a player bet, and the free attack game state, in which symbols are arranged without the condition of a player bet. Specifically, if the symbol arrangement device 111A places symbols the prescribed number of times in a normal game, the area range standardizing device 116A determines that the prescribed time has arrived. In a free attack game, however, the area range standardizing device 116A does not make a standardizing condition determination and does not return the range of the symbol-arranging area RH210 to the standard range.

The standardizing condition may be based on the time elapsed in a game. That is, the area range standardizing device 116A may return the range of the symbol-arranging area RH210 to the standard range when a prescribed amount of time has elapsed in the game. For example, if the prescribed amount of time has elapsed from the return of the range of the symbol-arranging area RH210 to the standard range, the area range standardizing device 116A may determine that the prescribed amount of time has elapsed, which is at least one standardizing condition. Because the game apparatus 1A can return the range of the symbol-arranging area RH210 to the standard range each time a prescribed amount of time has elapsed in the game, this can avoid the player too easily obtaining the specific reward.

The game apparatus 1A also has an area range determination device 117A that determines whether or not the range of the area in which symbols can be arranged (for example, the symbol-arranging area RH210) has become the specific range. The specific reward granting device 118A grants the specific reward with at least the condition that the area range determination device 117A determines that the range of the symbol-arranging area RH210 has become the specific range. Because the specific reward can be granted with at least the range of the symbol-arranging area RH210 having become the specific range as a condition, this enables the game apparatus 1A to heighten in a stepwise manner the feeling of expectation with respect to the specific reward.

For example, the area range determination device 117A may determine whether or not the range of the area into which symbols can be arranged (for example, the symbol-arranging area RH210) has become the specific range before the above-noted standardizing condition has been satisfied. By doing this, the game apparatus 1A can make it difficult for the range of the symbol-arranging area RH210 to become the specific range, thereby avoiding the player too easily obtaining the specific reward.

Also, for example, if the range of the area in which symbols can be arranged (for example, the symbol-arranging area RH210) is an area of a prescribed number of rows and/or a prescribed number of columns, the area range determination device 117A determines that it has become the specific range. Because the game apparatus 1A establishes the specific range as a range having a prescribed number of rows and/or a prescribed number of columns, this enables the player to be made to intuitively grasp alter how long the specific reward will be obtained.

The specific range may a range in which a prescribed number of symbols can be arranged, and the specific range may be a range that includes or does not include a specific placement location.

(Variation Examples)

Although embodiments of the present invention have been described, with references made to the drawings, the specific configuration is not restricted to the above-described embodiments and encompasses designs, for example, that are within the scope of the spirit of the present invention. For example, the constituent elements of the above-noted first embodiment and second embodiment may be arbitrarily combined.

Although in the above-described embodiments, the example described is one in which the area range standardizing device 116, 116A returns the range of the symbol-arranging area RH110, RH210 to a fixed range (three rows and five columns, 15 levels and five columns) as the standard range if the standardizing condition is satisfied, the standard range is not restricted to being a fixed range and may be dynamically set. For example, in the second embodiment, depending upon the timing, the standard range may be set to 15 levels and five columns or set to eight levels and five columns. The standard range may be dynamically selected from among a plurality of ranges of areas in which symbols can be arranged that are represented as different shapes. The area range standardizing device 116, 116A may dynamically establish the range of the area to be the standard range for each satisfying of a prescribed condition. For example, the area range standardizing device 116, 116A may establish or change the range of the area to be the standard range for each satisfying of the standardizing condition. By doing this, the game apparatus 1, 1A can provide a slot machine game with diversity. The game apparatus 1, 1A need not have an area range standardizing device 116, 116A. That is, the specifications may be such that the game is ended without returning the range of the symbol-arranging area RH110, RH210 to standard range.

The specific reward granting device 118, 118A may establish the content of the specific reward in accordance with the timing at which the range of the symbol-arranging area RH110, RH210 became the specific range. By doing this, the game apparatus 1, 1A can grant a higher-value specific reward, the earlier the range of the symbol-arranging area RH110, RH210 becomes the specific range.

The specific reward granting device 118, 118A may establish the content of the specific reward in accordance with the number of times symbol placement is done by the symbol arrangement device 111, 111A up until the timing of the range of the symbol-arranging area RH110, RH210 becoming the specific range after returning to the standard range. By doing this, the game apparatus 1, 1A can grant a higher-value specific reward, the fewer is the number of games before the range of the symbol-arranging area RH110, RH210 becomes the specific range.

The specific reward granting device 118, 118A may establish the content of the specific reward in accordance with the time required from the range of the symbol-arranging area RH110, RH210 returning to the standard range up until the time at which it becomes the specific range. By doing this, the game apparatus 1, 1A can grant a higher-value specific reward, the shorter is the time required for the range of the symbol-arranging area RH110, RH210 to become the specific range.

The specific reward granting device 118, 118A may establish the content of the specific reward in accordance with the player bet amount from the return of the range of the symbol-arranging area RH110, RH210 to the standard range up until the time at which it becomes the specific range. By doing this, the game apparatus 1, 1A can grant a higher-value specific reward, the greater is the player bet amount up until the range of the symbol-arranging area RH110, RH210 becomes the specific range.

Although the above-noted embodiments have been described for the example in which a disbursement is granted as the normal reward by a win determination, there is no restriction to a win determination for granting of a disbursement. For example, the win determination may be for transitioning to a secondary game or bonus game (such as a free attack game).

A game object such as a medal, card, coin, ball, or the like may be used as the symbol.

A program for implementing the functions of the above-described game control devices 110 and 110A may be recorded in a computer-readable recording medium, the program recorded in the recording medium being read into a computer system and executed so as to perform processing as the game control devices 110 and 110A. In this case, "program recorded in recording medium being read into a computer system and executed" includes installation of the program into a computer system. The term "computer system" includes an operating system and hardware such as peripheral devices. The "computer system" may also include a plurality of computers connected via a network, which includes the Internet, a WAN, a LAN, or a dedicated communication circuit. The term "computer-readable recording medium" refers to a removable medium such as a flexible disk, an optomagnetic disk, a ROM, a CD-ROM, or the like, or a storage device such as a hard-disk drive or the like built into a computer system. In this manner, the recording medium into which the program is stored may a non-volatile recording medium such as a CD-ROM. The recording medium may be internally or externally provided recording medium that can be accessed from a distribution server for distributing the program. The code of the program stored in the recording medium of the distribution server may be different from the code of a program of a format that can be executed in a terminal device. That is, as long as downloading and installation from a distribution server are done to enable execution in a terminal device, there is no restriction on the format in which storage is done on the distribution server. The program may be divided into multiple parts that are downloaded at different times and merged later at a terminal device, and the divided program parts may be distributed by different distribution servers. Additionally, the term "computer-readable recording medium" includes one holding a program for a given period of time, such as a volatile memory (RAM) within a computer system serving as a server or client in the case in which a program is transmitted via a network. The above-noted program may be for implementing a part of the above-described functionality. Additionally, it may be a so-called difference file (difference program) enabling a combination with a program that already has recorded the above-noted functionality in a computer system.

A part or all of the functions of the above-described game control devices 110 and 110A may be implemented as an integrated circuit, such as an LSI (large-scale integration) device. Each of the above-described functions may be implemented as separate processors or a part or all thereof may be integrated into a processor. The method of circuit integration is not restricted to being LSI, and implementation may be done using dedicated circuitry or a general-purpose processor. In the event that advances in semiconductor technology result in integrated circuit technology that supplants LSI, an integrated circuit using that technology may be used.

From the foregoing, the present invention can be understood as follows. Although, as a convenience to facilitate an understanding of the present invention, reference symbols of the attached drawings are indicated in parentheses, there is no restriction to the illustrated aspects of the present invention.

A game apparatus (1, 1A) according to one aspect of the present invention has a symbol arrangement device (111, 111A, S102, S202) that can arrange two or more symbols of a plurality of types, change condition determination device (114, 114A, S108, S212) that determines whether or not an area change condition for changing the range of an area in which symbols can be arranged by the symbol arrangement device has been satisfied based on at least a part of the symbols arranged by the symbol arrangement device, an area range changing device (115, 115A, S110, S214) that changes the range of the area in which symbols can be arranged when the change condition determination device determines that the area change condition has been satisfied, and a specific reward granting device (118, 118A, S114, S218) that grants a specific reward with at least the condition that the range of the area in which symbols can be arranged has become the specific range. According to the above-described configuration, because the game apparatus can cause the player to intuitively grasp after how long the specific reward will be obtained, based on the change of the range of the area in which symbols can be arranged, the feeling of expectation with respect to the specific reward can be heightened in a stepwise manner.

Some aspects of the embodiments provide the game apparatus described above, further having an area range standardizing device (116, 116A, S10, S16) that makes the range of the area in which symbols can be arranged the standard range if a standardizing condition is satisfied, wherein the specific reward granting device grants a specific reward with at least the range of the area in which symbols can be arranged having become the specific range before the standardizing condition is satisfied as a condition. According to the last-described configuration, the game apparatus can make it difficult for the range of the area in which symbols can be arranged to become the specific range and can avoid the player too easily obtaining the specific reward.

An aspect of the present invention is the game apparatus described above, wherein the change condition determination device makes the inclusion of a prescribed type of symbol in at least a part of the symbols arranged by the symbol arrangement device at least one area change condition. According to the last-described configuration, because the appearance of a prescribed type of symbol (for example a "range change" symbol) causes a change of the range of the area in which symbol can be arranged and this change leads to the granting of a specific reward, the game apparatus can cause the player to intuitively grasp after how long the specific reward will be obtained.

Some aspects of the embodiments provide the game apparatus described last, wherein the area range changing device changes the range of the area in which symbols can be arranged, in accordance with the number of symbols of the prescribed type that are arranged. According to this configuration, because the more symbols of a prescribed type (for example, the "range change" symbol) that appear, the greater is the change in the range of the area in which symbols can be arranged, the game apparatus can make it easy for the range of the area in which symbols can be arranged to become the specific range and can increase the probability that the player obtains a specific reward.

Some aspects of the present embodiments provide the game apparatus described above, wherein the change condition determination device, of the range of the area in which symbols can be arranged, changes the range of the area in which a determination is made of whether or not the area change condition is satisfied. According to this configuration, because the game apparatus makes it easy to change the range of the area in which symbols of a prescribed type (for example, the "range change" symbol) can be arranged by expanding the range of the area in which a determination is made of whether or not the area change condition is satisfied, it can increase the feeling of expectation by the player with respect to the specific reward.

Some aspects of the present embodiments provide the game apparatus described above, wherein the area range changing device changes the number of symbols that can be arranged by changing the range of the area in which symbols can be arranged. According to this configuration, the game apparatus can also grant the specific reward based on the number of symbols that can be arranged. For example, the game apparatus 1A can grant the specific reward if the number of symbols that can be arranged in the range of the area in which symbols can be arranged is a prescribed number, is at least a prescribed number, or is less than a prescribed number.

Some aspects of the present embodiments provide the game apparatus described above, wherein the area range standardizing device makes the arrival of a prescribed time at least one of the standardizing conditions. According to this configuration, because the range of the area in which symbols can be arranged can be returned to the standard range at a prescribed time, the game apparatus can avoid the player too easily obtaining the specific reward.

Some aspects of the present embodiments provide the game apparatus described above, wherein the area range standardizing device determines that the prescribed time has arrived if symbol placement has been performed by the symbol arrangement device a prescribed number of times.

According to this configuration, because the game apparatus can return the range of the area in which symbols can be arranged to the standard range each time symbols are arranged a prescribed number of times, it can avoid the player too easily obtaining the specific reward.

Some aspects of the present embodiments provide the game apparatus described above, wherein the area range standardizing device dynamically establishes the range of the area that becomes the standard range for each satisfying of a prescribed condition. According to this configuration, the game apparatus can provide a slot machine game with diversity.

Some aspects of the present embodiments provide the game apparatus described above, which further include an area range determination device (117, 117A, S112, S216) that determines whether or not the range of the area in which symbols can be arranged has become the specific range, wherein the specific reward granting device grants a specific reward with at least the condition that the area range determination device has determined that the range of the area in which symbols can be arranged has become the specific range. According to this configuration, because the game apparatus can grant a specific reward with at least the range of the area in which symbols can be arranged becoming the specific range as a condition, it can heighten the expectation with respect to the specific reward in a stepwise manner.

Some aspects of the present embodiments provide the game apparatus described above, which further includes an area range standardizing device that makes the range of the area in which symbols can be arranged the standard range if the standardizing condition is satisfied, wherein the area range determination device determines whether or not the range of the area in which symbols can be arranged has become the specific range before the standardizing condition has been satisfied. According to this configuration, the game apparatus can make it difficult for the range of the area in which symbols can be arranged to become the specific range, and can avoid the player too easily obtaining the specific reward.

Some aspects of the present embodiments provide the game apparatus described above, wherein the area range determination device determines that the range of the area in which symbols can be arranged has become the specific range if it is a range of a prescribed number of rows and/or a prescribed number of columns. According to this configuration, because the game apparatus establishes the specific range as a range having a prescribed number of rows and/or a prescribed number of columns, it can cause the player to intuitively grasp after how long the specific reward will be obtained.

Some aspects of the present embodiments provide the game apparatus described above, wherein the specific reward granting device establishes the content of the specific reward in accordance with the timing of the range of the area in which symbols can be arranged becoming the specific range. According to this configuration, the game apparatus can grant a higher-value specific reward, the earlier the range of the area in which symbols can be arranged becomes the specific range.

Some aspects of the present embodiments provide the game apparatus described above, which further include a specific-value accumulation device (119A, S214) that can accumulate a plurality of types of different specific values, wherein the specific reward granting device selects one or more types of specific values from among the accumulated specific values and makes the selection a part of the specific reward. According to this configuration, the game apparatus can increase the value of the specific reward based on a plurality of different specific values (for example, items) obtained during the game and can increase the feeling of expectation by the player with respect to the specific reward.

Same aspects of the present embodiments provide a program for causing a computer to function as the game apparatus described above. According to this configuration, because the program can cause the player to intuitively grasp after how long the specific reward will be obtained, based on the change of the range of the area in which symbols can be arranged, the feeling of expectation with respect to the specific reward can be heightened in a stepwise manner.

Each element or device for the game apparatus described above can be implemented by hardware with or without software. In some cases, the game apparatus may be implemented by one or more hardware processors and one or more software components wherein the one or more software components are to be executed by the one or more hardware processors to implement each element or device for the game apparatus. In some other cases, the game apparatus may be implemented by a system of circuits or circuitry configured to perform each operation of each element or device for the game apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A game apparatus comprising:

a symbol arrangement device configured to arrange a plurality of symbols which are different in type from among each other;

a change condition determination device configured to determine, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device;

an area range changing device configured to change the range of the symbol-arranging area in case that the change condition determination device determined that there is satisfied the area change condition; and a specific reward granting device configured to grant a specific reward in cases that there is satisfied at least a specific range condition that the range of the symbol-arranging area is changed by the area range changing device into a specific range.

2. The game apparatus according to claim 1, further comprising:

an area range standardizing device configured to standardize the range of the symbol-arranging area into a standard range in case that at least a standard condition is satisfied, and wherein the specific reward granting device is configured to grant the specific reward in cases that there is satisfied at least a specific range timing condition that the range of the symbol-arranging area is changed by the area range changing device into the specific range before the standard condition is satisfied.

3. The game apparatus according to claim 1, wherein the change condition determination device is configured to determine whether or not there is satisfied the area change condition that at least a part of the plurality of symbols is of a predefined specific type.

4. The game apparatus according to claim 3, wherein the area range changing device is configured to change the range of the symbol-arranging area, based at least in part on the number of symbols of the predefined specific type.

5. The game apparatus according to claim 1, wherein the change condition determination device is configured to change a range of determination area in the range of the symbol-arranging area, where the change condition determination device determines whether or not there is satisfied the area change condition on the range of determination area.

6. The game apparatus according to claim 1, wherein the area range changing device is configured to change the range of the symbol-arranging area to change the number of symbols arrangeable on the symbol-arranging area.

7. The game apparatus according to claim 2, wherein the area range standardizing device is configured to standardize the range of the symbol-arranging area into a standard range in case that the at least standard condition that a predetermined timing comes is satisfied.

8. The game apparatus according to claim 7, wherein the area range standardizing device is configured to determine that the predetermined timing comes and the standard condition is satisfied in case that the symbol arrangement device performed symbol arrangement at predefined times.

9. The game apparatus according to claim 2, wherein the area range standardizing device is configured to automatically determine the range of the symbol-arranging area every time a predefined range determination condition is satisfied.

10. The game apparatus according to claim 1, further comprising:

- an area range determination device configured to determine whether the range of the symbol-arranging area becomes a specific range, and
- wherein the specific reward granting device is configured to grant the specific reward in cases that there is satisfied at least a specific range determination condition that the area range determination device determined that the range of the symbol-arranging area becomes the specific range.

11. The game apparatus according to claim 10, further comprising:

- an area range standardizing device configured to standardize the range of the symbol-arranging area into a standard range in case that at least a standard condition is satisfied, and
- wherein the area range determination device is configured to determine whether the range of the symbol-arranging area becomes the specific range before the at least standard condition is satisfied.

12. The game apparatus according to claim 10, wherein the area range determination device is configured to determine that the range of the symbol-arranging area becomes the specific range in case that the area range determination device determined that the range of the symbol-arranging area has at least one of a predefined number of rows and columns.

13. The game apparatus according to claim 11, wherein the area range determination device is configured to determine that the range of the symbol-arranging area becomes the specific range in case that the area range determination device determined that the range of the symbol-arranging area has at least one of a predefined number of rows and columns.

14. The game apparatus according to claim 1, wherein the specific reward granting device is configured to determine contents of the specific reward, based on a timing when the range of the symbol-arranging area becomes the specific range.

15. The game apparatus according to claim 2, wherein the specific reward granting device is configured to determine contents of the specific reward, based on a timing when the range of the symbol-arranging area becomes the specific range.

16. The game apparatus according to claim 1, further comprising:

- a specific-value accumulation device configured to accumulate specific-values of plural types which are different in value from among each other,
- wherein the specific reward granting device is configured to select one or more of the specific-values of plural types which are different in value from among each other, wherein the specific-values are accumulated.

17. The game apparatus according to claim 5, further comprising:

- an area range determination device configured to determine whether the range of the symbol-arranging area becomes a specific range, and
- wherein the specific reward granting device is configured to grant the specific reward in cases that there is satisfied at least a specific range determination condition that the area range determination device determined that the range of the symbol-arranging area becomes the specific range.

18. The game apparatus according to claim 17, wherein the area range determination device is configured to determine that the range of the symbol-arranging area becomes the specific range in case that the area range determination device determined that the range of the symbol-arranging area has at least one of a predefined number of rows and columns.

19. A game method comprising:

- arranging a plurality of symbols which are different in type from among each other;
- determining, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device;
- changing the range of the symbol-arranging area in case that the change condition determination device determined that there is satisfied the area change condition; and
- granting a specific reward in cases that there is satisfied at least a specific range condition that the range of the symbol-arranging area is changed by the area range changing device into a specific range.

20. A non-transitory computer readable storage medium that stores one or more computer programs, when executed by a computer, to cause the computer, to perform a game method comprising:

- arranging a plurality of symbols which are different in type from among each other;
- determining, based at least in part on at least a part of the plurality of symbols arranged by the symbol arrangement device, whether or not there is satisfied at least an area change condition for changing a range of a symbol-arranging area on which the plurality of symbols can be arranged by the symbol arrangement device;
- changing the range of the symbol-arranging area in case that the change condition determination device determined that there is satisfied the area change condition; and
- granting a specific reward in cases that there is satisfied at least a specific range condition that the range of the symbol-arranging area is changed by the area range changing device into a specific range.

* * * * *